US012380080B2

(12) United States Patent
Erett et al.

(10) Patent No.: US 12,380,080 B2
(45) Date of Patent: Aug. 5, 2025

(54) SYSTEM AND METHOD FOR ENTITY TIMESLICING FOR DISAMBIGUATING ENTITY PROFILES

(71) Applicant: Cognism Limited, Richmond (GB)

(72) Inventors: Johannes Julien Frederik Erett, London (GB); James A Hodson, El Cerrito, CA (US)

(73) Assignee: Cognism Limited, Richmond (GB)

( * ) Notice: Subject to any disclaimer, the term of this patent is extended or adjusted under 35 U.S.C. 154(b) by 0 days.

(21) Appl. No.: 18/210,043

(22) Filed: Jun. 14, 2023

(65) Prior Publication Data

US 2023/0325371 A1 Oct. 12, 2023

Related U.S. Application Data

(63) Continuation-in-part of application No. 17/481,866, filed on Sep. 22, 2021, now Pat. No. 12,169,508.
(Continued)

(51) Int. Cl.
*G06F 16/22* (2019.01)
*G06F 16/23* (2019.01)
(Continued)

(52) U.S. Cl.
CPC ...... *G06F 16/2228* (2019.01); *G06F 16/2365* (2019.01)

(58) Field of Classification Search
None
See application file for complete search history.

(56) References Cited

U.S. PATENT DOCUMENTS 8,849,813 B1 * 9/2014 Iyer et al. ............... G06Q 10/10
707/728
9,619,571 B2 * 4/2017 Lightner ............ G06F 16/2228
(Continued)

OTHER PUBLICATIONS

Xiaozhi Chen; Multi-View 3D Object Detection Network for Autonomous Driving; IEEE; pp. 1-9.*
(Continued)

*Primary Examiner* — Ann J Lo
*Assistant Examiner* — Jermaine A Mincey
(74) *Attorney, Agent, or Firm* — DICKINSON WRIGHT RLLP; Hector A. Agdeppa

(57) ABSTRACT

Systems and methods for disambiguating attributes associated with one or more entity profiles using timeslicing is described. An entity disambiguation computer receives information associated with one or more entities. The received information includes attributes related to one or more entities. Attributes are extracted and disambiguated from the information to generate timeslice objects representing the attributes. The timeslice objects are associated with one or more indices based on the respective durations of the timeslice objects. The timeslice objects and respective one or more indices are arranged based on timelines associated with the timeslice objects. On the generation of a new timeslice object, the entity disambiguation computer determines the position of the new timeslice object with respect to positions of existing timeslice objects and updates the arrangement of the timeslice objects based on the position of the new timeslice object.

10 Claims, 18 Drawing Sheets

Related U.S. Application Data

(60) Provisional application No. 63/081,761, filed on Sep. 22, 2020.

(51) Int. Cl.
    *G06F 16/24*      (2019.01)
    *G06F 40/295*    (2020.01)

(56) References Cited

U.S. PATENT DOCUMENTS

| | | | |
|---|---|---|---|
| 9,779,363 B1* | 10/2017 | Hansen | G06F 16/285 |
| 10,997,134 B2 | 5/2021 | Osesina et al. | |
| 11,182,395 B2 | 11/2021 | Mirylenka et al. | |
| 2006/0271526 A1* | 11/2006 | Charnock | G06Q 30/02 |
| 2013/0262501 A1* | 10/2013 | Kuchmann-Beauger | G06F 16/24535 707/769 |
| 2014/0075004 A1* | 3/2014 | Van Dusen | G07C 13/00 709/223 |
| 2017/0123714 A1* | 5/2017 | Smith | G06F 3/0619 |
| 2019/0327732 A1 | 10/2019 | Yoon | |
| 2020/0081917 A1* | 3/2020 | Hirmer | G06F 16/9024 |
| 2020/0394709 A1* | 12/2020 | Cella | G06Q 20/405 |

OTHER PUBLICATIONS

David Pinto; Table Extraction Using Conditional Random Fields; 2003;ACM; pp. 235-242.

USPTO; Non-Final Office Action issued in U.S. Appl. No. 17/481,866; Sep. 19, 2022; pp. 1-9, USPTO.

USPTO; Final Office Action issued in U.S. Appl. No. 17/481,866; Jan. 24, 2024; pp. 1-12, USPTO.

Nan-Ying Liang, A Fast and Accurate Online Sequential Learning Algorithm for Feedforward Networks; IEEE; 2006; p. 1411-1423.

USPTO; Non-Final Office Action issued in U.S. Appl. No. 18/210,084; Jan. 31, 2024; p. 1-58, USPTO.

James Hendler; Data Integration for Heterogenous Datasets; Big Data; 2014; pp. 205-215.

* cited by examiner

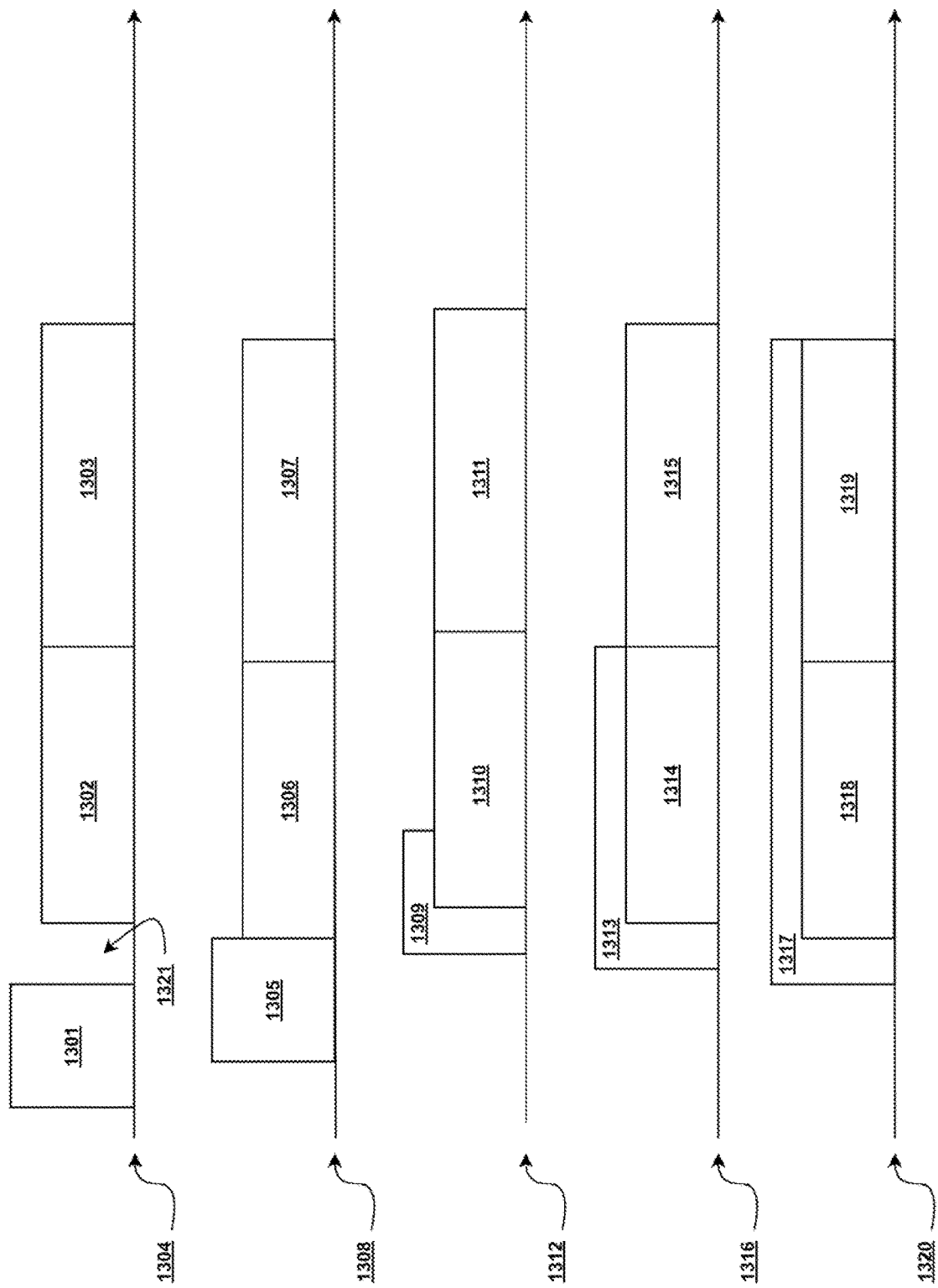

SYSTEM AND METHOD FOR ENTITY TIMESLICING FOR DISAMBIGUATING ENTITY PROFILES

CROSS-REFERENCE TO RELATED APPLICATIONS

This application is a continuation-in-part of U.S. provisional application Ser. No. 17/481,866 titled, "SYSTEM AND METHOD FOR ENTITY DISAMBIGUATION FOR CUSTOMER RELATIONSHIP MANAGEMENT" filed on Sep. 22, 2021, which claims the benefit of, and priority to U.S. provisional application 63/081,761 titled, "SYSTEM AND METHOD FOR ENTITY DISAMBIGUATION" filed on Sep. 22, 2020, the entire specification of which is incorporated herein by reference.

BACKGROUND OF THE INVENTION

Field of the Art

The disclosure relates to the field of research fields of named entity recognition and entity linking.

Discussion of the State of the Art

Named Entity Recognition and Classification (NERC) is a process of recognizing information units like names, including person, organization, and location names, and numeric expressions including time, date, money, and percent expressions from unstructured text. Entity linking is the task to link entities mentioned in the text with their corresponding entities in a knowledge base. Potential applications include information extraction, information retrieval, and knowledge base population. However, this task is challenging due to name variations and entity ambiguity. Currently, entity linking usually deals with a static "view" of an entity. But most entities (like people or companies) change dynamically over time. The knowledge database has multiple versions of the input data associated with the same entity over different periods, leading to duplication and ambiguity in a knowledge database. Therefore, therein is a need to manage the multiple versions of attributes, such as entity name, entity location, and employee-related data over different periods to provide a disambiguous knowledge database.

SUMMARY OF THE INVENTION

In some aspects, the techniques described herein relate to a system for disambiguating attributes associated to one or more entities, the system including: a entity database; an entity disambiguation computer including a memory, a processor, and a plurality of programming instructions, the plurality of programming instructions when executed by the processor cause the processor to: receive information associated with a candidate entity among one or more entities in an entity database at pre-defined intervals; extract one or more attributes associated with the candidate entity; create, for each attribute among the one or more attributes, a plurality of timeslice objects, wherein the plurality of timeslice objects are valid for respective durations, and wherein the entity disambiguation computer generates the plurality of timeslice objects based on the one or more attributes extracted from the one or more entities; associate the plurality of timeslice objects with one or more indices based on the respective durations of the plurality of timeslice objects, wherein the plurality of timeslice objects and respective one or more indices are arranged based on timelines associated with the plurality of timeslice objects; determine a position of a new timeslice object of the plurality of timeslice objects with respect to the positions of other timeslice objects of the plurality of timeslice objects, wherein the new timeslice object is a latest created timeslice object; and update the arrangement of the plurality of timeslice objects based on the position of the new timeslice object.

In some aspects, the techniques described herein relate to a system, wherein to update the plurality of timeslice objects, the plurality of instructions when executed by the processor, further cause the processor to: responsive to determining that a first date associated with the new timeslice object is ahead of a second date associated with a previous timeslice object among the plurality of timeslice objects, determine if a duration associated with the new timeslice object is less than a duration of the previous timeslice object, wherein the previous timeslice object is adjacent to the new timeslice object in the plurality of timeslice objects; responsive to determining that the duration associated with the new timeslice object is less than the duration of the previous timeslice object, generate a new index in the new timeslice object.

In some aspects, the techniques described herein relate to a system, wherein to update the plurality of timeslice objects, the plurality of instructions when executed by the processor, further cause the processor to: responsive to determining that the duration of the new timeslice object is less than the duration of the previous timeslice object, generate an empty timeslice object, wherein the empty timeslice object signifies an information gap in the timeline between the new timeslice object and the previous timeslice object.

In some aspects, the techniques described herein relate to a system, wherein to update the plurality of timeslice objects, the plurality of instructions when executed by the processor, further cause the processor to: responsive to determining that the duration associated with the new timeslice object is greater than the duration of the previous timeslice object, split an index associated with the previous timeslice object into a first index and a second index, wherein duration of the first index is a duration for which the new timeslice object overlaps the previous timeslice object, and wherein the duration of the second index is a remaining duration when the previous timeslice object is non-overlapping with the new timeslice object.

In some aspects, the techniques described herein relate to a system, wherein the plurality of instructions when executed by the processor, further cause the processor to: compute, for each attribute, distance vectors between selected timeslice objects, wherein a vectorizer uses the timeline associated with selected timeslice objects to compute the distance vectors between the timeslice objects, wherein the selected timeslice objects share overlapping durations; predict if the selected timeslice objects correspond to a same entity based on the distance vectors; responsive to predicting that the selected timeslice objects correspond to the same entity, combine the selected timeslice objects by merging the selected timeslice objects into a single entity identity record; and generate an unambiguous entity database by merging the selected timeslice objects.

In some aspects, the techniques described herein relate to a system, wherein one or more attributes includes a location, a geocode, an entity name, a stock symbol, a registered entity identity, an entity classification code, an entity uniform resource links (URLs), an employee data, an entity event, a technology domain, an entity group connection, an entity brand, and a competitor.

In some aspects, the techniques described herein relate to a method for disambiguating attributes associated with one or more entities, the method including: receiving, at an entity disambiguation computer, information associated with a candidate entity among one or more entities in an entity database at pre-defined intervals; extracting one or more attributes associated with the candidate entity; creating, for each attribute among the one or more attributes, a plurality of timeslice objects, wherein the plurality of timeslice objects are valid for respective durations, and wherein the entity disambiguation computer generates the plurality of timeslice objects based on the one or more attributes extracted from the one or more entities; associating the plurality of timeslice objects with one or more indices based on the respective durations of the plurality of timeslice objects, wherein the plurality of timeslice objects and respective one or more indices are arranged based on timelines associated with the plurality of timeslice objects; determining a position of a new timeslice object of the plurality of timeslice objects with respect to the positions of other timeslice objects of the plurality of timeslice objects, wherein the new timeslice object is a latest created timeslice object; and updating the arrangement of the plurality of timeslice objects based on the position of the new timeslice object.

In some aspects, the techniques described herein relate to a method, wherein updating the plurality of timeslice objects further includes the steps of: responsive to determining that a first date associated with the new timeslice object is ahead of a second date associated with a previous timeslice object among the plurality of timeslice object, determining if a duration associated with the new timeslice object is less than a duration of the previous timeslice object, wherein the previous timeslice object is adjacent to the new timeslice object in the plurality of timeslice objects; responsive to determining that the duration associated with the new timeslice object is less than the duration of the previous timeslice object, generating a new index in the new timeslice object.

In some aspects, the techniques described herein relate to a method, wherein updating the plurality of timeslice objects further includes the steps of: responsive to determining that the duration of the new timeslice object is less than the duration of a previous timeslice object, generating an empty timeslice object, wherein the empty timeslice object signifies an information gap in the timeline between the new timeslice object and the previous timeslice object.

In some aspects, the techniques described herein relate to a method, wherein updating the plurality of timeslice objects further includes the steps of: responsive to determining that the duration associated with the new timeslice object is greater than the duration of the previous timeslice object, splitting an index associated with the previous timeslice object into a first index and a second index, wherein duration of the first index is a duration for which the new timeslice object overlaps the previous timeslice object, and wherein the duration of the second index is a remaining duration when the previous timeslice object is non-overlapping with the new timeslice object.

In some aspects, the techniques described herein relate to a method, the method further including: computing, by the entity disambiguation computer, for each attribute, distance vectors between selected timeslice objects, wherein a vectorizer uses the timeline associated with selected timeslice objects to compute the distance vectors between the timeslice objects, wherein the selected timeslice objects share overlapping durations; predicting if the selected timeslice objects correspond to a same entity based on the distance vectors; responsive to predicting that the selected timeslice objects correspond to the same entity, merging the selected timeslice objects into a single entity identity record; and generating an unambiguous entity database by merging the selected timeslice objects.

In some aspects, the techniques described herein relate to a method, wherein the one or more attributes includes a location, a geocode, an entity name, a stock symbol, a registered entity identity, an entity classification code, an entity uniform resource links (URLs), an employee data, an entity event, a technology domain, an entity group connection, an entity brand, and a competitor.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 9A:
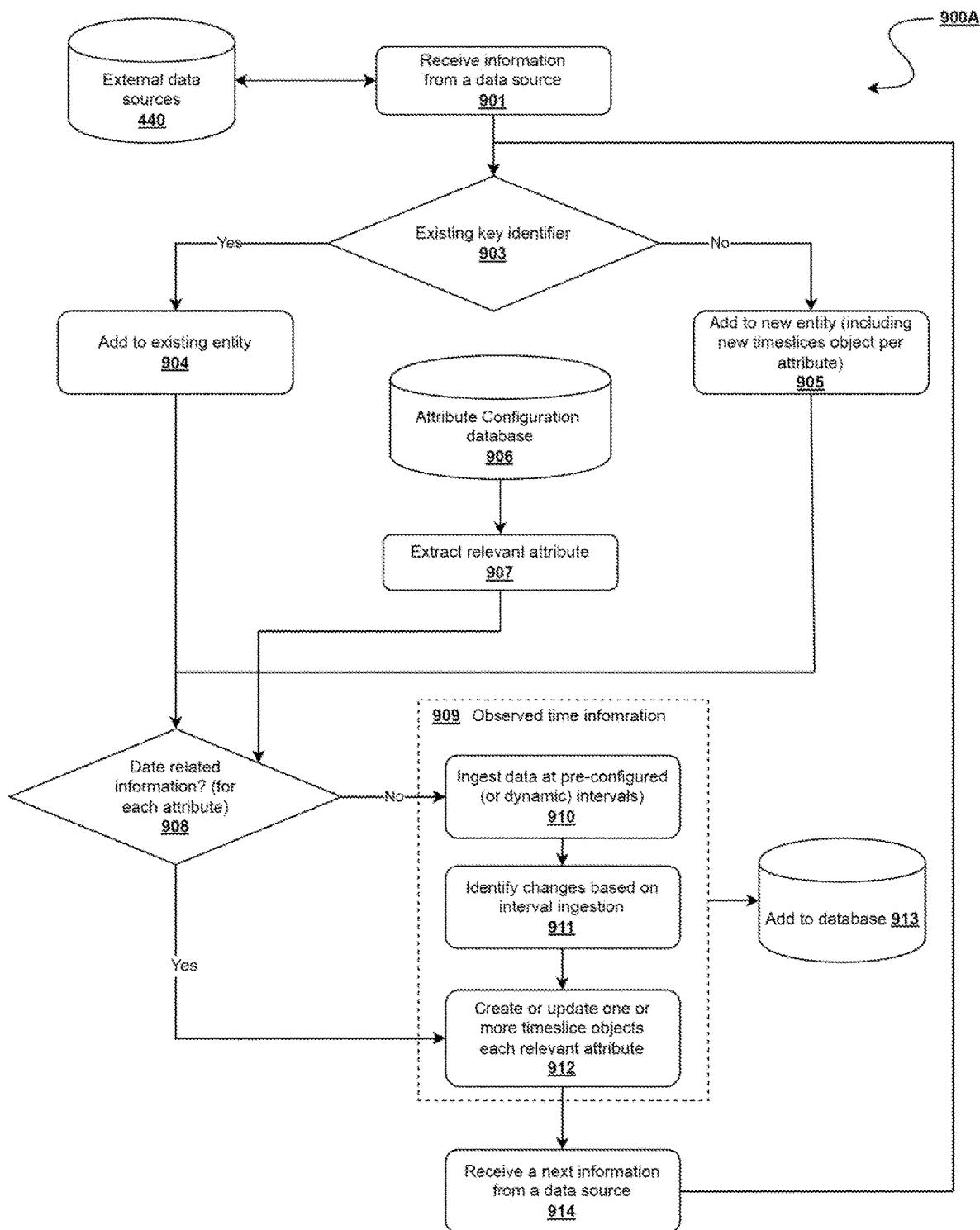
Figure 9B:
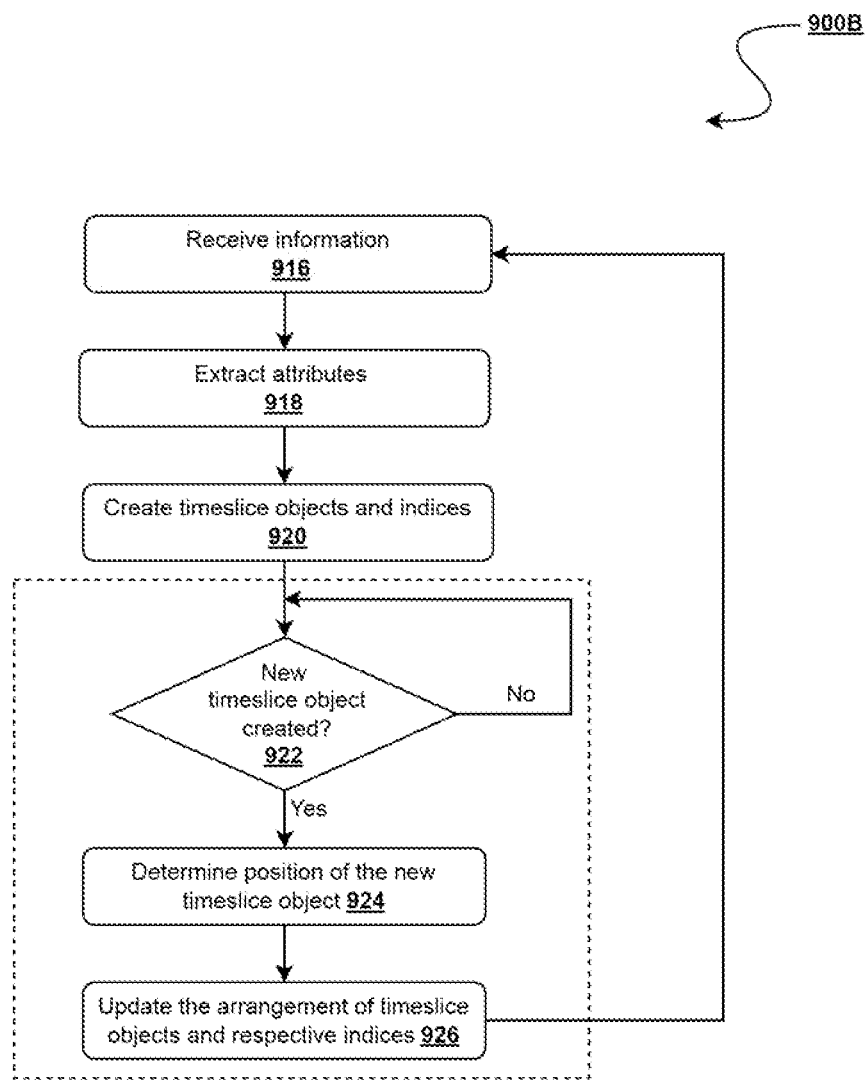
Figure 10:
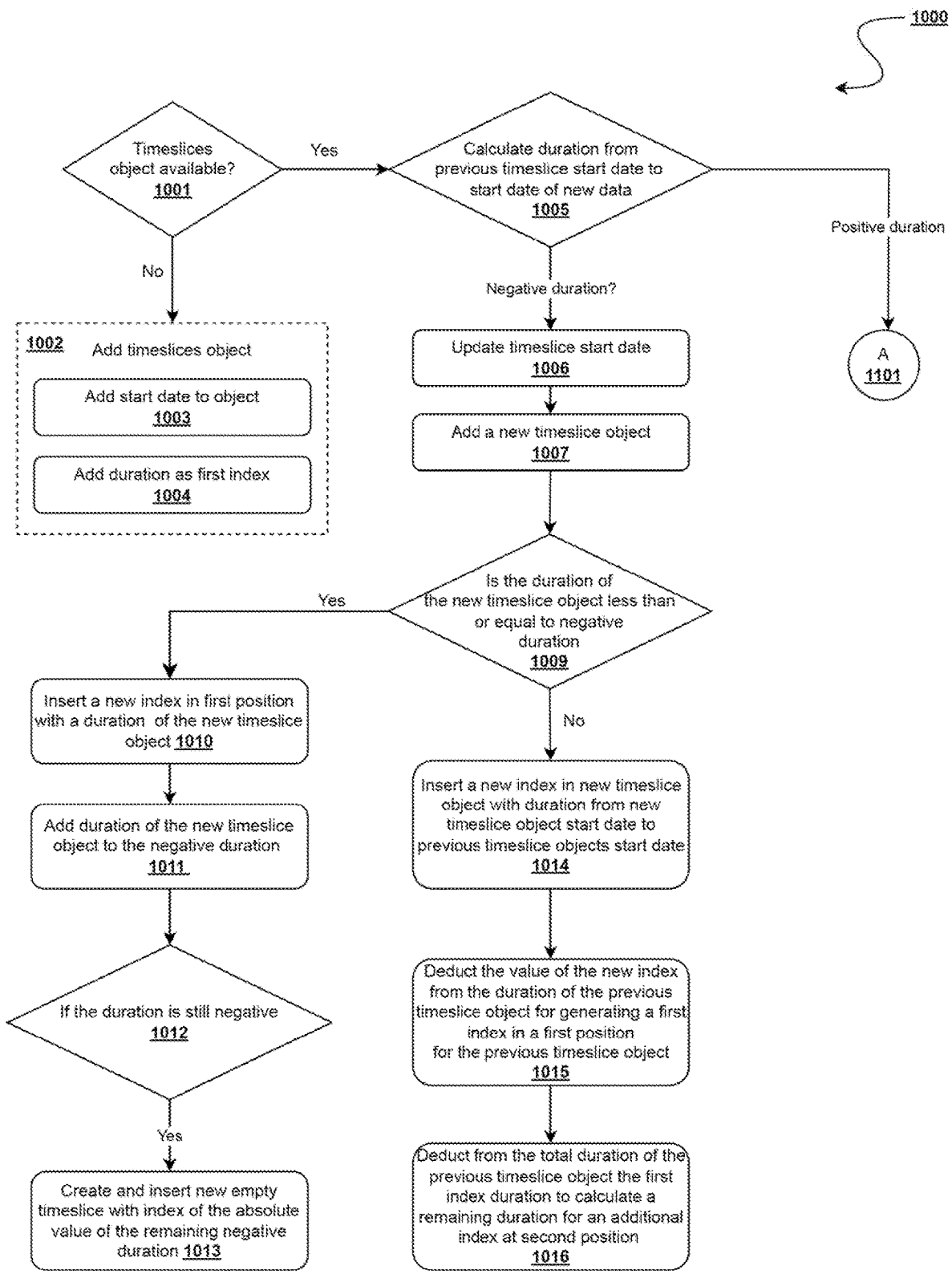
Figure 11:
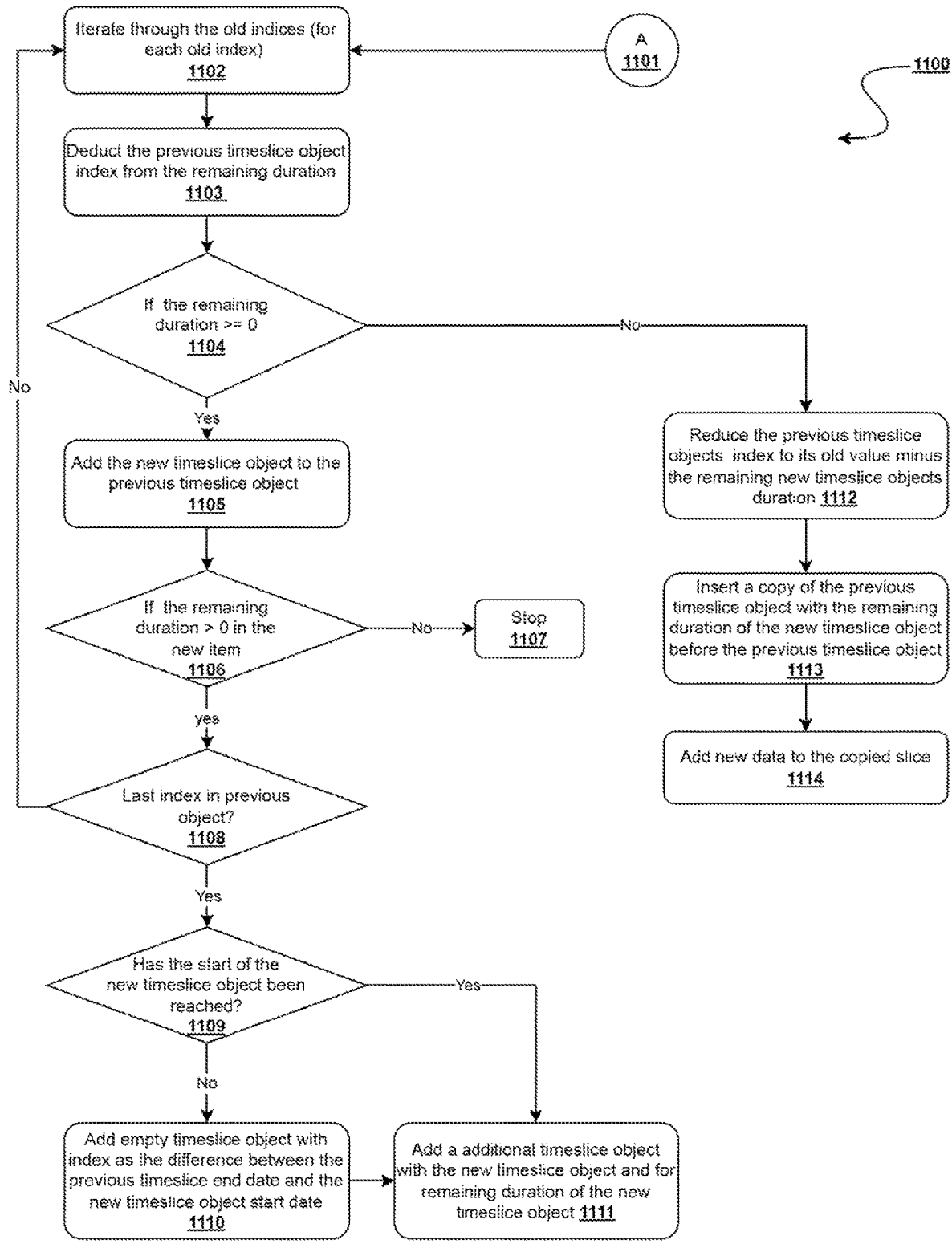
Figure 12:
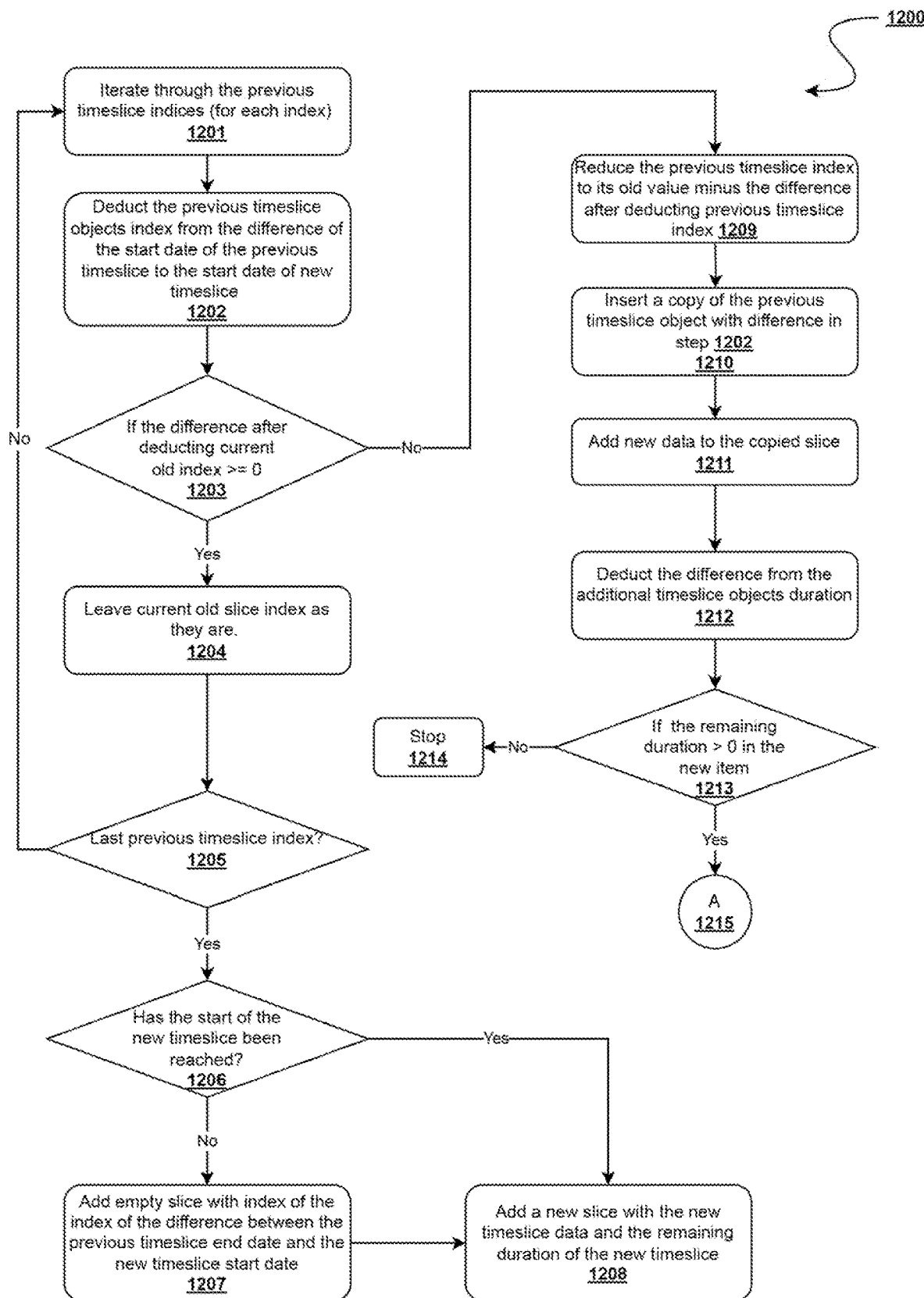
Figure 13B:
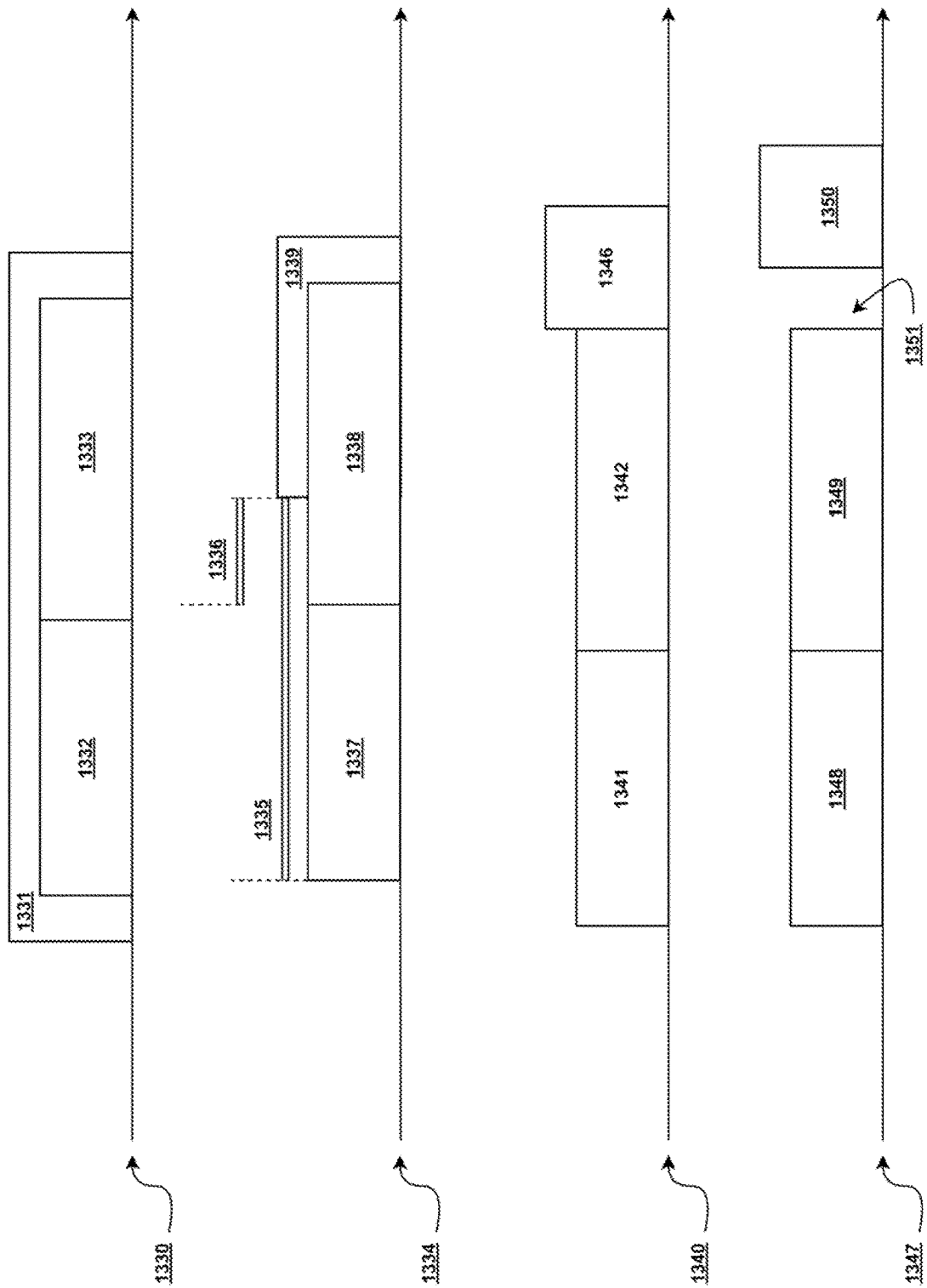
Figure 14A:
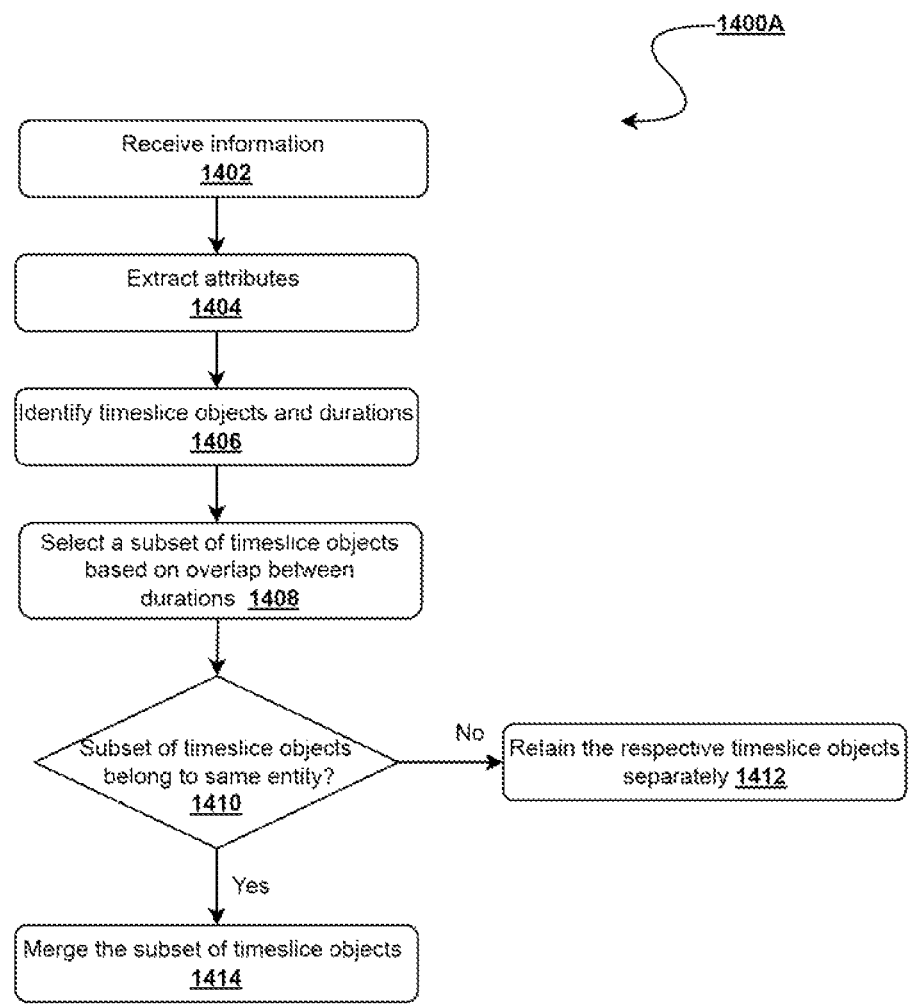
Figure 14B:
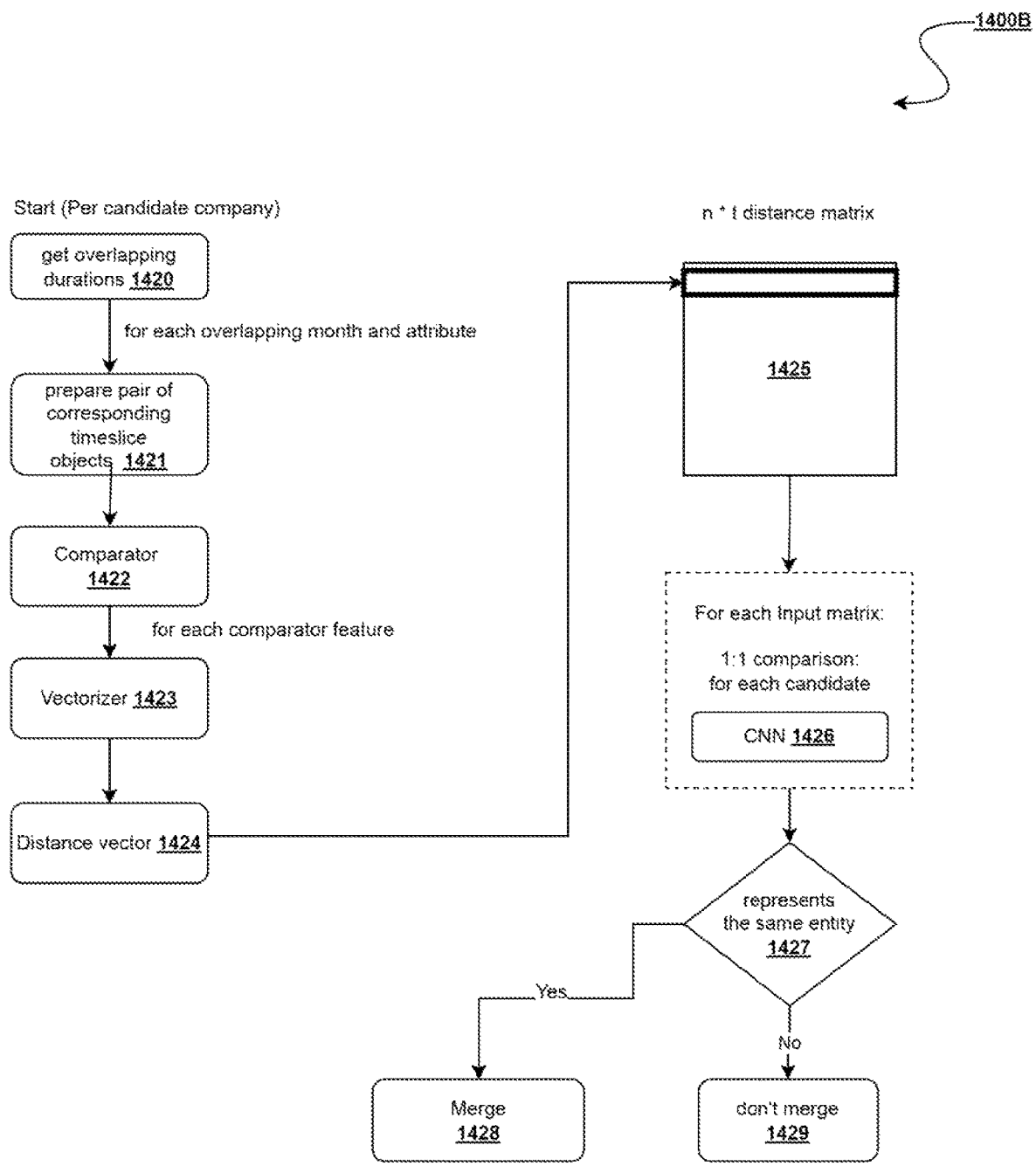

FIG. 9A a flow diagram illustrating a method for ingesting and storing entity-related data in entity database using timeslice objects, in accordance with a preferred embodiment of the invention;

FIG. 9B is flow diagram illustrating a method for managing timeslice objects, in accordance with a preferred embodiment of the invention;

FIG. 10-12 illustrate flow diagrams depicting different methods for updating a plurality of timeslice objects, in accordance with a preferred embodiment of the invention;

FIGS. 13A and 13B illustrates different scenarios in which the position of a new timeslice objects affects the arrangement of existing timeslice objects on a timeline, in accordance with a preferred embodiment of the invention;

FIG. 14A is a flow diagram illustrating a method for disambiguating attributes associated with a candidate entity, in accordance with a preferred embodiment of the invention; and FIG. 14B is a flow diagram illustrating a method for predicting if timeslice objects belong a same candidate entity in accordance with a preferred embodiment of the invention.

DETAILED DESCRIPTION

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical, and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. On the contrary, a variety of optional components may be described to illustrate a wide variety of possible embodiments of one or more of the inventions and to fully illustrate one or more aspects of the inventions. Similarly, although process steps, method steps, algorithms, or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer programming instructions stored in memory. Such network devices may have multiple network interfaces that may be configured or designed to utilize different types of network communication protocols. A general architecture for some of these machines may be described herein to illustrate one or more exemplary means by which a given unit of functionality may be implemented. According to specific embodiments, at least some of the features or functionalities of the various embodiments disclosed herein may be implemented on one or more specifically designed computers associated with one or more networks, such as, for example, an end-user computer system, a client computer, a network server or other server system, a mobile computing device (e.g., tablet computing device, mobile phone, smartphone, laptop, or other appropriate computing devices), a consumer electronic device, a music player, or any other suitable electronic device, router, switch, or other suitable devices, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Entity—The term "entity" refers to an individual or an organization that runs a business. The entity may be a company, establishment, corporation, operation, partnership, chain, conglomerate, firm, syndicate, or enterprise.

Timeslice object: The term "timeslice object" refers to an object that holds information about a company attribute over time. The timeslice object organizes the company data that is valid for a specific period for fast data retrieval with minimal storage overhead.

Attribute: The term "attribute" refers to data associated with an entity. The attribute may change with time. Examples of the attribute may include but are not limited to, a location, a geocode, an entity name, a stock symbol, a registered entity identity, an entity classification code, an entity uniform resource links (URLs), employee data, an entity event, a technology domain, an entity group connection, an entity brand, and a competitor. The terms attributes and data attributes have been used interchangeably in the document.

Figure 1:
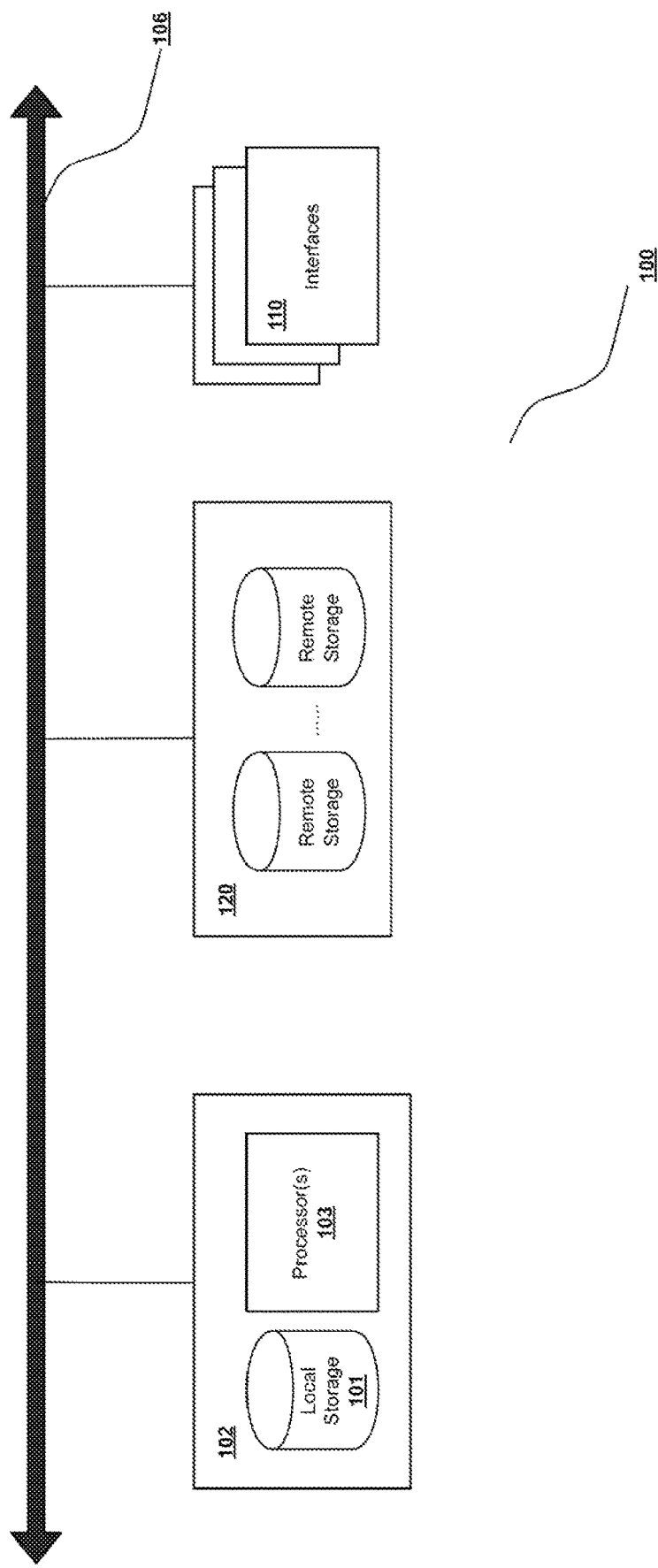
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interface 110 is provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT", PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interface 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art about personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid-state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
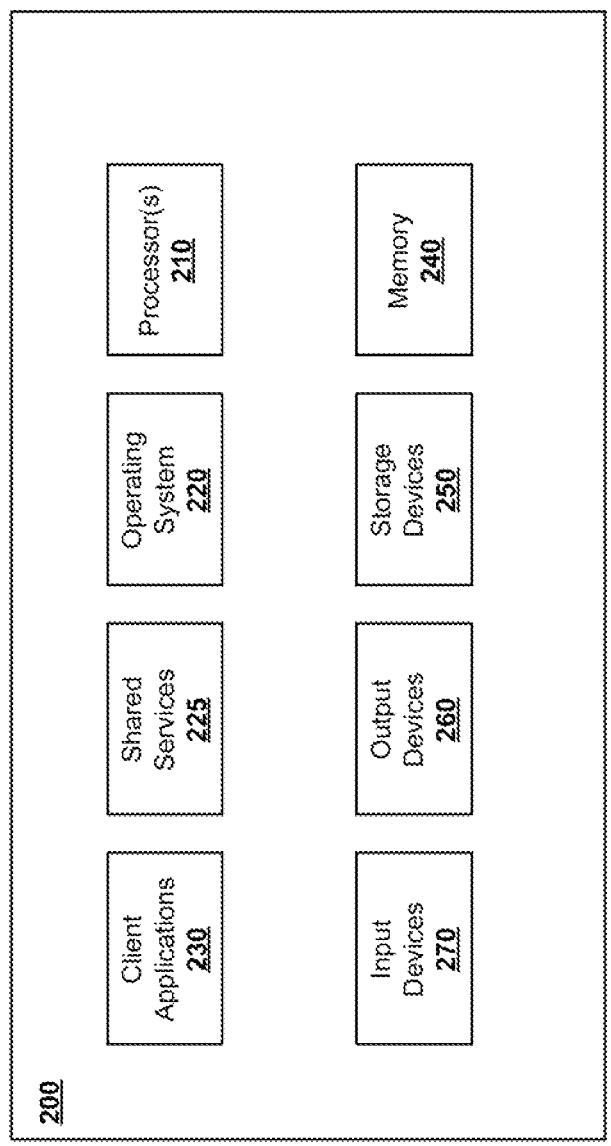
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carries out one or more functions or applications of embodiments of the invention, such as, a client application 230. Processors 210 may carry out computing instructions under the control of an operating system 220 such as, for example, a version of Microsoft's WINDOWS' operating system, Apple's Mac OS/X or iOS operating systems, some variety of the Linux operating system, Google's ANDROID' operating system, or the like. In many cases, one or more shared services 225 may be operable in system 200 and may be useful for providing common services to client applications 230. Services 225 may for example be WINDOWS' services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example, to run the software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
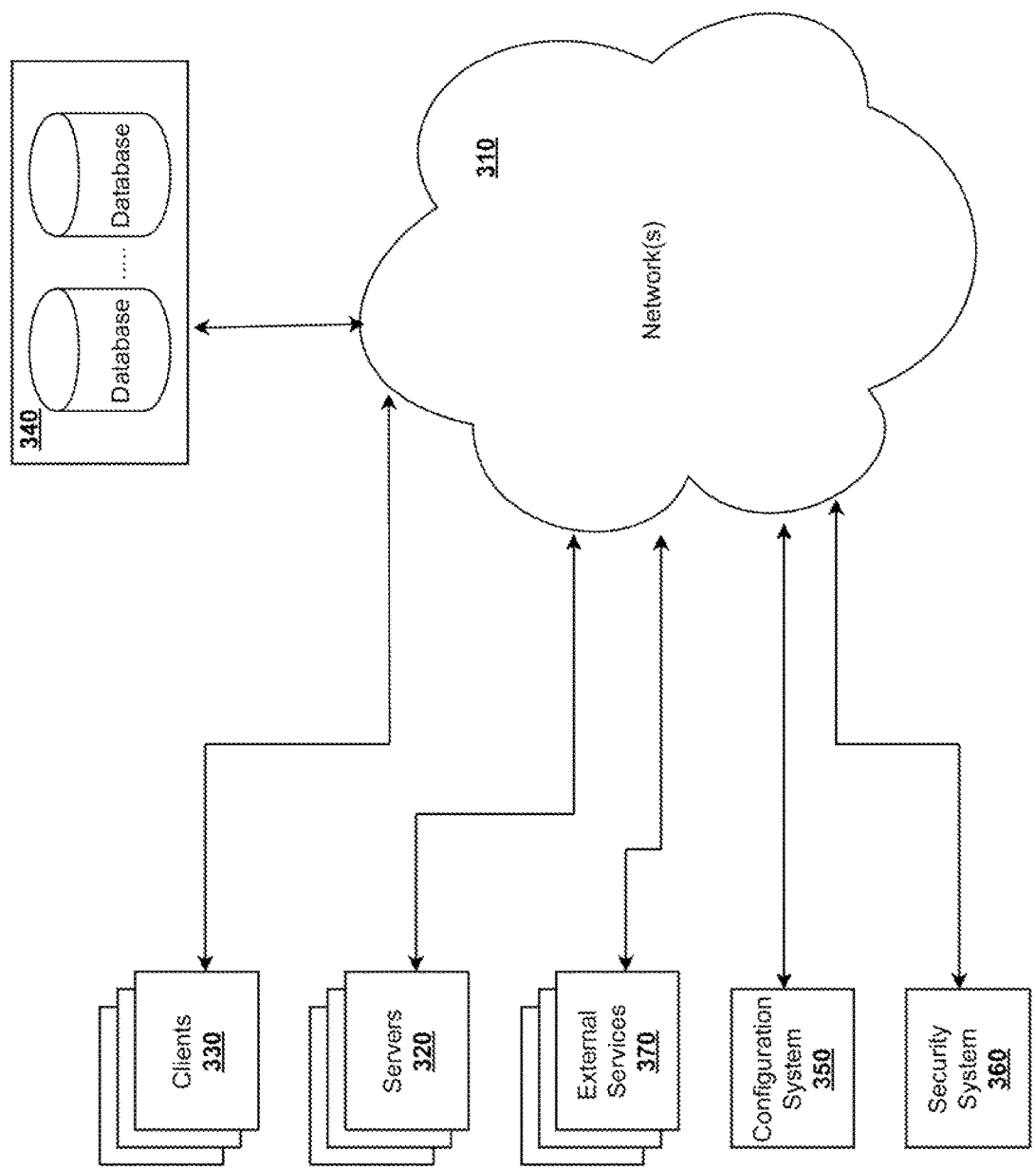
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of particular enterprises or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4A:
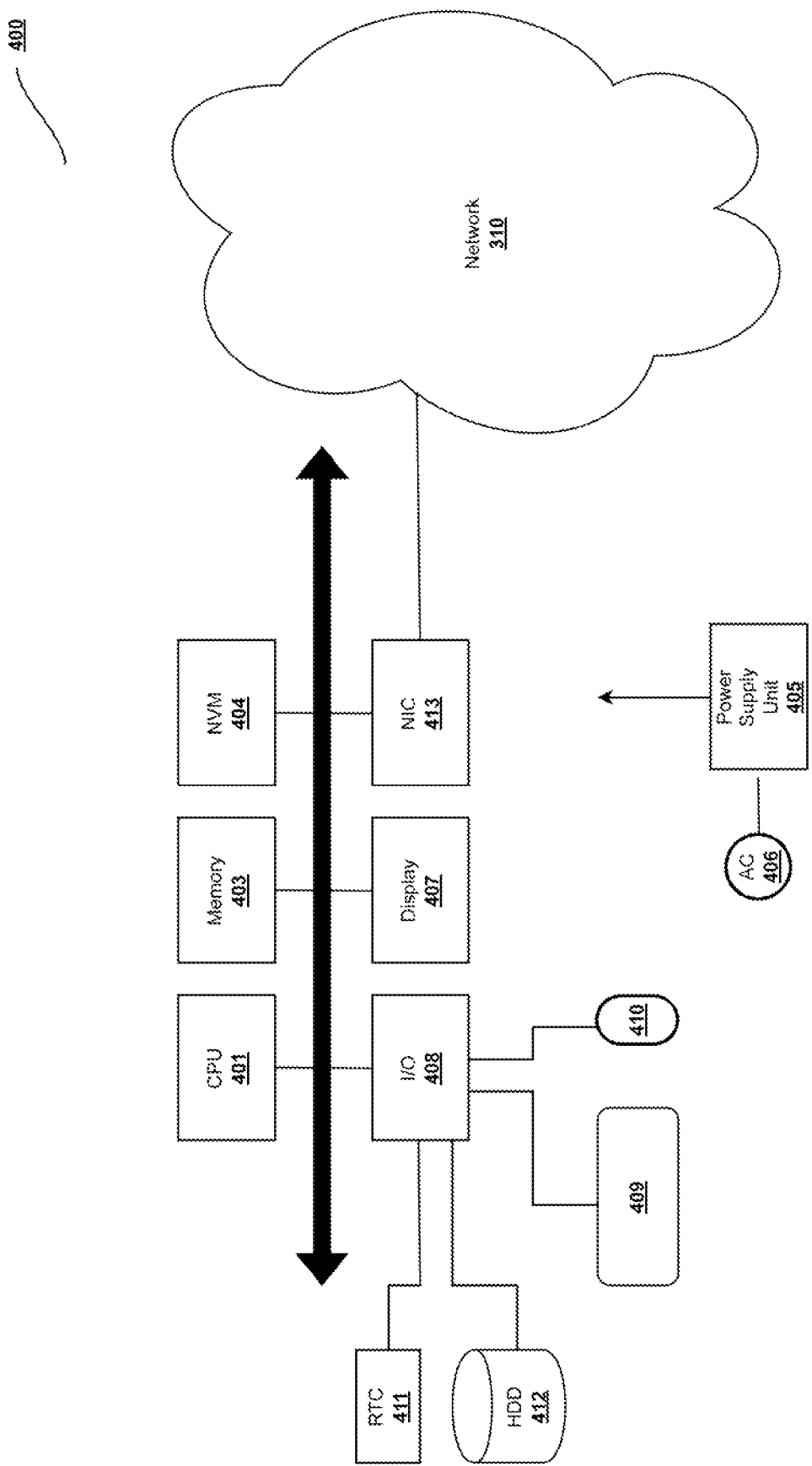
FIG. 4A is another block diagram illustrating an exemplary hardware architecture of a computing device used in various embodiments of the invention.

FIG. 4A shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4B:
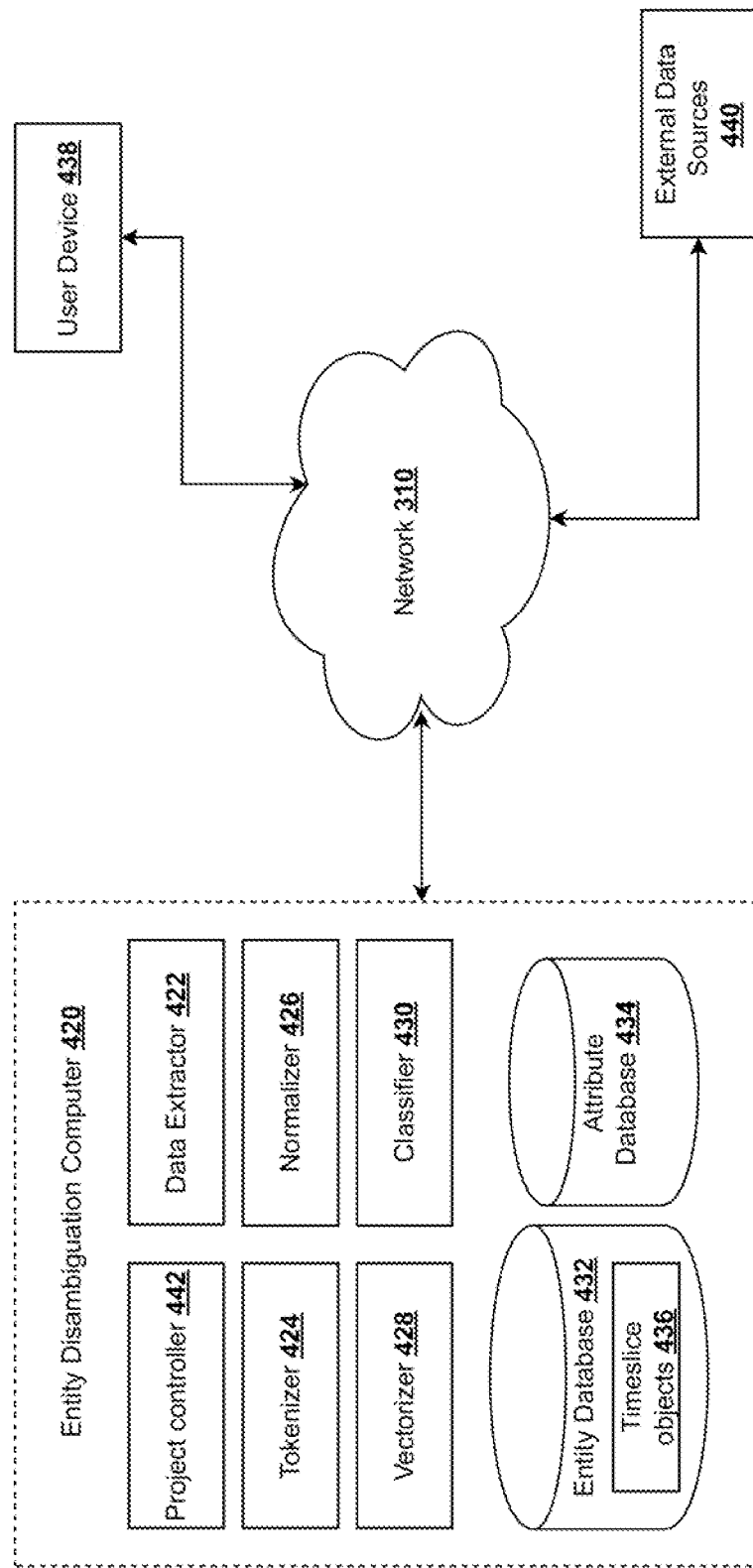
FIG. 4B illustrates a block diagram illustrating an entity disambiguation system for generating a disambiguous entity database, according to a preferred embodiment of the invention.

FIG. 4B illustrates a block diagram illustrating an entity disambiguation system for generating a disambiguous entity database, according to a preferred embodiment of the invention. According to the embodiment, entity disambiguation computer 420 comprises processor 210, memory 240, and a plurality of programming instructions, the plurality of programming instructions stored in memory 240 that when executed by processor 210 cause the processor to disambiguate attributes associated with one or more entities. Entity disambiguation computer 420 further comprises project controller 442, data extractor 422, tokenizer 424, normalizer 426 vectorizer 428, a classifier 430, entity database 432, and attributes database 434.

Entity disambiguation computer 420 is in communication with user device 438 and external data sources 440 over network 310. User device 438 is similar to client's 330 as described in FIG. 3. External data sources 440 may be external information sources such as resume data, company websites, government filings, social media, etc., or internal information sources such as company records, internal reports, annual reports, and the like.

The information received from external data sources 440 is stored in entity database 432 after data extraction. Entity database 432 may also be referred to as candidate database. Further, as information associated with entities is dynamic and attributes associated with the entity are constantly changing, the information received may include multiple versions associated with the same entity leading to duplication and ambiguity in data stored in entity database 432. For example, for a trained human, it might be obvious to know from previous knowledge that "Google" and "Alphabet" could lead in fact to the same company, at least for employment records from October 2015 or later. However, entity disambiguation computer 420 cannot depend on previous knowledge or "common sense" to identify that both records are to be associated with the same company. Ambiguity may be found in multiple attributes leading to a reduction in the accuracy of data stored in the entity database 432 along with increased storage requirement. Entity disambiguation computer 420 may be configured to ingest and maintains information related to entities.

Data extractor 422 is configured to read and extract data attributes from information received via external data sources 440. Data extractor 422 may run one or more functions to extract different types of data attributes. Details related to data extractor 422 and the types of attributes extracted are described in conjunction with FIGS. 5 and 6.

Tokenizer 424 is a natural language processing (NLP) tool to split paragraphs and sentences into smaller units that can be easily assigned meaning. Normalizer 426 is another NLP tool for reducing the randomness in received data and bringing the data to a pre-defined standard. Tokenizer 424 and normalizer 426 operate in conjunction with data extractor 422 while ingesting data associated with the entities.

Vectorizer 428 converts the distance between overlapping timeslice objects into vectors. The timeslice objects are objects that holds information about a company attribute over periods in time. The vector values are used by project controller 442 to predict similarity. A similarity model is used by entity disambiguation computer 420 to identify the similarity between two or more timeslice objects based on algorithmic distance functions. Classifier 430 may include a machine-learning model that is trained before doing predictions of similarity.

Data attributes extracted by the data extractor 422 may be maintained by entity database 432 using timeslice objects 436. The timeslice objects 436 may be updated based on new information. More details on the update of timeslice objects 436 is explained in conjunction with FIG. 7. The update may be performed periodically with interval set based on user preference. In an embodiment, updates for information related to entities may be collected by entity disambiguation computer 420 based on a periodic interval set for data ingestion.

Attributes database 434 may store and maintain the functions used by entity disambiguation computer 420 for receiving information from external data sources 440 and extracting the data attributes from the received information. The functions and attributes are described in detail in FIG. 6. Attribute database 434 stores all the different attributes related to one or more entities.

In a preferred embodiment of the invention, software consists of components for data ingestion, attribute extraction, attribute disambiguation, data storage, model training, and prediction. Software components may be developed in Python but could be implemented in other languages. Input data is read from text files with records in JSON or CSV format, but other formats could be used. PostgreSQL 11.2 may be used as a database, but other databases could be used. A relational database may be used for large amounts of records that may be queried based on pre-defined fields/attributes.

Figure 5:
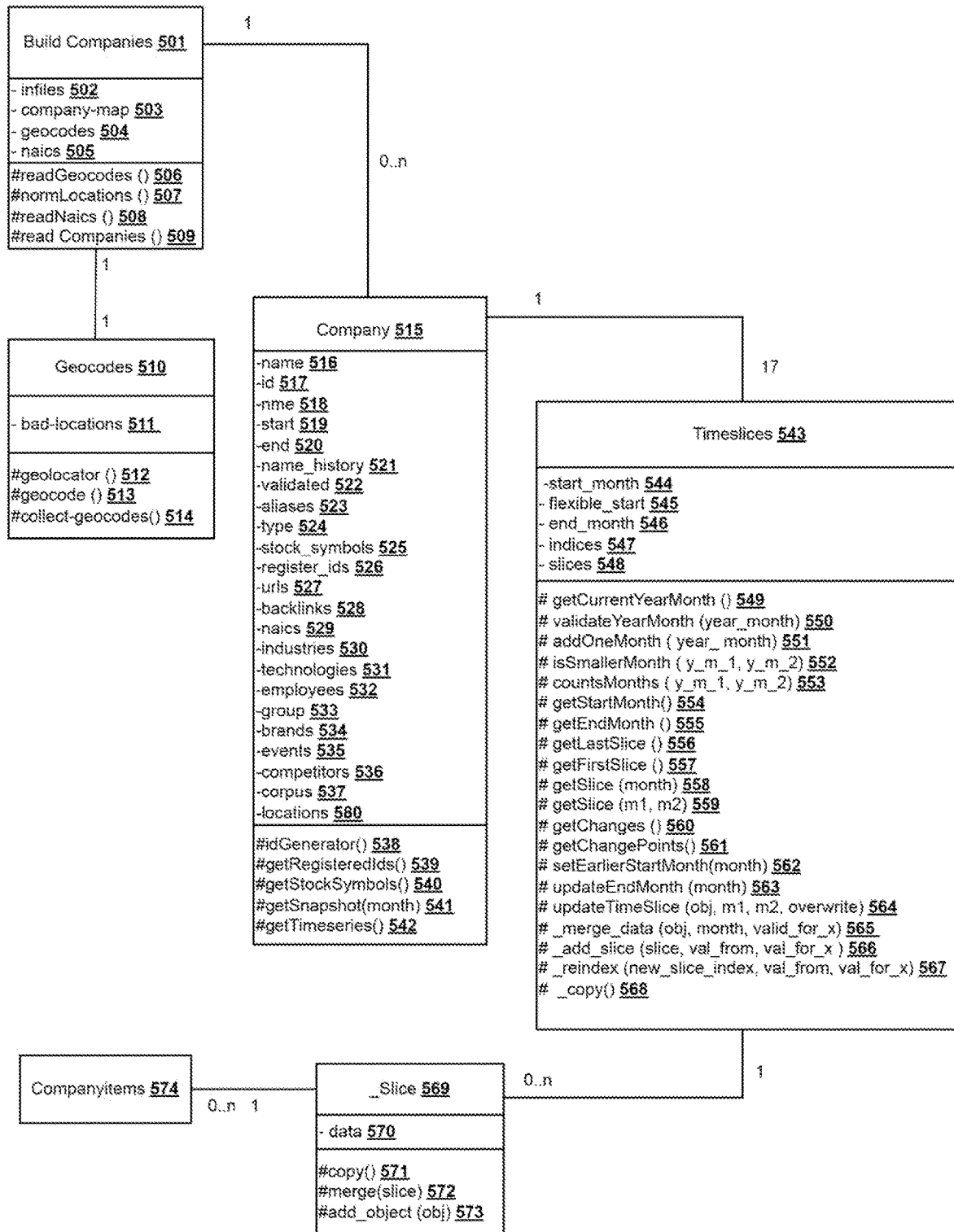
FIG. 5 is a snapshot illustrating objects used by entity disambiguation computer for managing entity information, in accordance with a preferred embodiment of the invention.

FIG. 5 is a snapshot illustrating objects used by entity disambiguation computer 420 for managing entity information, in accordance with a preferred embodiment of the invention. According to the embodiment, project controller 442 may create a plurality of objects to manage attribute extraction and classification processes for the received information. As shown in FIG. 5, objects may comprise classes, such as, build companies 501, geocodes 510, company 515, timeslices 543, slices 569, and companyitems 574. Each of these objects may be associated with company related data attributes and one or more functions may be configured to obtain information stored in the objects. The objects may store data received from external data sources 440.

In an embodiment, class build companies 501 may contain subclasses including infiles 502, company-map 503, geocodes 504, and naics 505. Further, the functions used to extract data attributes may include readgeocodes ( ) 506, normlocations ( ) 507, readnaics ( ) 508, and readcompanies ( ) 509.

In the embodiment, the classes may store data about company information, as retrieved from one or more internal and/or external data sources. For example, one or more data sources may include resume data, organization websites, company reporting documents, internal and external databases, and the like. For example, infiles 502 may contain data about a company or organization obtained from internal files and reports associated with the company or organization. Further, company map 503 may contain data retrieved from organization charts, government filings, and stock information. Class geocodes 504 may similarly contain information about company locations, like global offices, countries, cities of operation, headquarter location, etc. For companies specifically operating in North America, NAICS 505 may contain information regarding North America Industry Classification Codes System (NAICS) for one or more companies that are being classified. Although the NAICS 505 may be representative of codes associated with North American entities, in one embodiment, NAICS 505 may also contain codes assigned to companies independently from their location.

Further, class build companies 501 may also include functions that may be operated by data extractor 422 to read and extract data attributes as described above. For instance, readgeocodes ( ) 506 function may be used by data extractor 422 to extract and read geocodes contained in geocodes 504. Similarly, normlocations ( ) 507 function may be used by normalizer 426 to generate normalized locations from the extracted geocodes, for example, by eliminating duplicate location data and standardizing location names. Further, the NAICS codes may be obtained by data extractor 422 by operating readnaics ( ) 508 function. Furthermore, readcompanies ( ) 509 function may be initialized by data extractor 422 to extract relevant company information as stored in company-map 503.

In a preferred embodiment, class geocodes 510 may be used by data extractor 422 to obtain geocodes for one or more given company locations asynchronously and deliver latitude and longitude information for requested locations. In the embodiment, class geocodes 510 may include information related to bad-locations 511. Further, to extract relevant geocode data class geocodes 510 may also include one or more functions such as geolocator ( ) 512, geocode ( ) 513, and collect-geocodes ( ) 514.

For example, in the embodiment, class bad-locations 511 may contain information associated with one or more locations for which geocodes 510 could not be found. This ensures that project controller 442 may not try to repeatedly find geocodes 510 for location field values, that could previously not be linked to a real location. Geolocator ( ) 512 may return the geo coordinates latitude and longitude for a given location.

In another embodiment, class company 515 may contain one or more data having stored bibliographic information for a given company. In the embodiment, class company 515 may include objects related to name 516, id 517, nme 518, start 519, end 520, name_history 521, validated 522, aliases 523, type 524, stock_symbols 525, register_ids 526, URLs 527, backlinks 528, naics 529, industries 530, technologies 531, employees 532, group 533, brands 534, events 535, competitors 536, and corpus 537.

Class Company 515 may be used for extracting relevant information for classification stored therein. For example, objects name 516 and ID 517 may have stored data associated with the company's official name on record, name changes, etc., and an official identification for the company (e.g., Employer Identification Number), respectively. Further, objects start 519 and end 520 may contain a date of incorporation of an organization and a date when the organization ceased to exist (if applicable), respectively. Other objects such as aliases 523 may contain information about different names of an organization, including but not limited to spelling variations, abbreviations, and other names associated with the organization. Similarly, objects industries 530 and technologies 531 may store data about industry sectors and technology domains the organization generally operates.

In an embodiment, to extract data stored in the aforementioned objects, data extractor 422 may run one or more functions, including but not limited to idgenerator( ) 538, getregisteredIds( ) 539, getstocksymbols( ) 540, getsnapshot (month) 541, and gettimeseries( ) 542. For instance, data extractor 422 may run the function getstocksymbol( ) 540 to extract a stock market ticker for a given publicly listed organization. In another example, data extractor 422 may run the function getregisteredIDs( ) 539 to extract registered identifications of an organization such as EIN, TIN, state IDs, etc.

In an embodiment, class timeslices 543 may be used by classifier 430 to classify information about a given company attribute over time. In the embodiment, timeslices 543 may be optimized for fast data retrieval and may minimize storage overhead. In several embodiments, different attributes of companies may change at different rates and at different points in time. For example, a first company that was previously headquartered in San Francisco may later move its operations to Austin, while the first company's name and stock symbol may remain unchanged. In the example, only class locations 580 may receive a new state that is, in one embodiment, a new slice of data. Further, this may enable project controller 442 to determine a change in the headquarter location for the first company, thereby ensuring that all extracted data for classification processes is current and highly relevant while historic data can still be retrieved, in a preferred embodiment, in a computationally inexpensive way. Each company attribute that may change over time, such as names, locations, stock symbols, etc. is organized in distinct timeslices 543 for each company.

Information related to data attributes of class company 515 stored within timeslices 543 may include start_month 544, flexible_start 545, end_month 546, indices 547, and slices 548. Each timeslice in timeslices 543 may contain a start_month 544 that may define the start time of the timeslices 543. In an embodiment, the start time may be representative of a start or founding date of a given company. The end_month 546 may contain data associated with an end time of a timeslices 543, e.g., in the case where the newest slice of the timeslices 543 may only be valid to such an end_month 546 and may not currently be valid anymore. That is, in an embodiment, end_month 546 may be populated if a given company is not active anymore and/or if a current value for the corresponding attribute is unknown. In another embodiment, flexible_start 545 may be set to "True", if the oldest slice of timeslices 543 is assumed to be valid if start_month 544 is updated to a time earlier than the current time. In an embodiment, for a given company having San Francisco marked as an earliest known office location, established in, e.g., May 2000, extraction of data from additional ingested information by data extractor 422 may further illustrate a corrected establishment date of the earliest known office, e.g., in December 1999. In such an embodiment, if flexible_start 545 for the locations 580 for the given company is determined to be set to "True", and the locations 580 for the given company from December 1999 to April 2000 be marked as San Francisco. However, if flexible_start 545 is determined to be set to "False", an empty slice may be added for the given period, e.g., indicating that no location is known for the given company from December 1999 to April 2000. Further, information related to each data attribute may be stored within an array of slices 548, in chronological order. Each slice 548 within the array of slices 548 may contain data, such as locations that may be valid for a given company and one or more other attributes at a distinct period. For each slice 548 in the array of slices 548 a corresponding integer may exist in the indices 547. In an embodiment, each corresponding integer may define many months for which the corresponding slice 548 may be valid. For instance, using at least start_month 544 and information stored in indices 547, a real-time state of a given attribute, at any given point in time may be swiftly retrieved from timeslices 543 by further processing by data extractor 422.

In an embodiment, data extractor 422 may run the first plurality of functions associated with class timeslices 543, for extracting relevant data as stored within the subclasses described above. In the embodiment, the functions for obtaining data related to start_month 544 and end_month 546 may include getstartmonth ( ) 554, and getendmonth ( ) 555. Further, one or more functions to assist with calculation of months and years may include getcurrentyearmonth ( ) 549, validateyearmonth (year_month) 550, addonemonth (year_month) 551, issmallermonth (y_m_1, y_m_2) 552, countsmonths (y_m_1, y_m_2) 553, and the like. For example, function getcurrentyearmonth ( ) 549 may return information about the current year and month to assign it to new information obtained about a given company today. Alternatively, validateyearmonth (year_month) 550 may verify if the year and month obtained from an external dataset are valid, for example, that the given month and year do not overshoot a current year and month. Furthermore, running function is smallermonth (y_m_1, y_m_2) 552 may verify whether a first value of year and month is smaller than a given year and month, for example, if the current start year and month of timeslices 543 is smaller than a given year and month in a new dataset. Also, countsmonths (y_m_1, y_m_2) 553 may return the number of months between the current start year and month of timeslices 543 and the year and month of a new datapoint that has to be inserted into the timeslices 543.

In another embodiment, data extractor 424 may run a second plurality of functions associated with class timeslices 543, for extracting relevant data as stored within slices 548. In the embodiment, the functions for obtaining data from slices 548 may include getlastslice ( ) 556, getfirstslice ( ) 557, getslice (month) 558, getslice (m1, m2) 559, getchanges ( ) 560, and getchangepoints ( ) 561. For example, getlastslice ( ) 556 may return the last available slice 548, which is the newest information that is available for a given corresponding company and company attributes. Similarly, getfirstslice ( ) 557 may return the slice 548 with the earliest information available. Further, getslice (month) 558 may return the slice 548 with information valid on a given year and month; and getslice (m1, m2) 559 may return all slices 548 that have been valid within a given time range. Finally, getchanges ( ) 560, and getchangepoints ( ) 561 may return a timeseries of data changes and the year-month combinations in which those changes have happened, respectively.

Further, other functions associated with class timeslices 543 may include setearlierstartmonth (month) 562, updateendmonth (month) 563, updatetimeslice (obj, m1, m2, overwrite) 564, _merge_data (obj, month, valid_for_x) 565, _add_slice (slice, val_from, val_for_x) 566, _reindex (new_slice_index, val_from, val_for_x) 567, and _copy ( ) 568. Those functions may be used by classifier 426 to change timeslices 543. For example, if a new data source discloses that a given company has existed already before the year and month currently set as start_month 544, setearlierstartmonth (month) 562 may update start_month 544 to that earlier year and month. Similarly, if flexible_start 545 is set to "true", setearlierstartmonth (month) 562 may add the number of months difference between the new and old start year and month to the first item of the indices 547 at index 0, indicating that the earliest slice 548 is now valid for a larger number of months. If flexible_start 545 is set to "false", setearlierstartmonth (month) 562 may add the number of months difference between the new and old start year and month as a new first item of the indices 547 at index 0, and add a new empty slice 548 to the slices 548, indicating that no information is known about the given company and attribute for the time difference between the old and new start year and month. Finally, updateendmonth (month) 563 may be used by project controller 442 to set end_month 546 to a given year and month. Further, updaatemmonth (month) 563 may be used by project controller 442 to update the last item in the indices 547 at index −1 to the difference between the time in months between the start_month 544 and end_month 546 minus the sum of all previous items in the indices 547 at indices 0 to −2. Each item in indices 547 may represent months that the corresponding slice 548 at the same index in slices 548 is valid for. Thus, the sum of numbers in indices 547 may be equal to the number of months between the start_month 544 and end_month 546.

In an embodiment, updatetimeslice (obj, m1, m2, overwrite) 564 may add additional data to a timeslices 543. In the above object, "obj" may refer to new data, for example a new location, name, or stock symbol. Further, "m1" may refer to the start year and month of initiation of said new data; and "m2" may refer to an end date of a given data object, if applicable. In one embodiment, if m2 is not available, is the value of m2 may be assumed to be valid on an ongoing basis. In the embodiment, "overwrite" may refer to a status of overwrite permissions and may be set to true or false by project controller 442. If overwrite is set to "true", all existing data for a given period, company, and information related to data attribute may be overwritten with new data. However, if overwrite is set to "false", new data objects may be added without overwriting existing data objects. In another embodiment, updatetimeslice (obj, m1, m2, overwrite) 564 may modify the timeslices 543 as shown in FIGS. 13A and 13B, describe various scenarios in which timeslices 543 may get updated.

Within the timeslices 543 update process, one or more internal functions may be used, including but not limited to, merge_data (obj, month, valid_for_x) 565 may be used to merge new data objects into existing slices 548 within the slices 548 that may be valid as well within the given period that the new data object is valid for; _add_slice (slice, val_from, val_for_x) 566 may add a new slice object of class_Slice 569 to the given timeslices 543, that is, to insert the slice on the correct index within slices 548 and to initiate an update of indices 547 by calling the function _reindex (new_slice_index, val_from, val_for_x) 567, which iterates through existing indices 548 and inserts a new integer representing months that the new slice is valid for and decreases the neighboring integers if the new slice partially overlaps with previously stored data; and _copy ( ) 568 may generate a copy of timeslices 543. In one embodiment, a copy of timeslices 543 may be required to update a current version of timeslices 543 in multiple steps, such as the steps _add_slice (slice, val_from, val_for_x) 566 and _reindex (new_slice_index, val_from, val_for_x) 567 while restoring information about its previous state until the full update is completed.

In an embodiment, another class _slice 569 may be used by timeslices 543 to store and retrieve data in timeslices 543. In the embodiment, timeslices 543 may be used by data extractor 422 to extract data to process class _slice 569 using data 570, and functions copy ( ) 571, merge(slice) 572, and add_object (obj) 573. Further, child classes of class companyitems 574 may be used by data extractor 422 to store the actual company information within the data 570 of slice 569. In an embodiment, copy ( ) 571 may return an exact copy of a given slice 569 including copies of the companyitems 574 within. Further, merge(slice) 572 may merge data related to companyitems 574 in two given _slice 569, and add_object (obj) 573 may add a new companyitems 574 into the data of a given _slice 569.

In a preferred embodiment, each object of company 515 may be linked to up to seventeen different objects within TimeSlices 543, however, each object within TimeSlices 543 may only associate with one specific object within company 515. That is, any given object within timeslices 543 may be assigned to each attribute within company 515, e.g., attributes 521-537, i.e., attributes of company 515 that may change over time, such as company name history, validated, aliases, type, etc.

Figure 6:
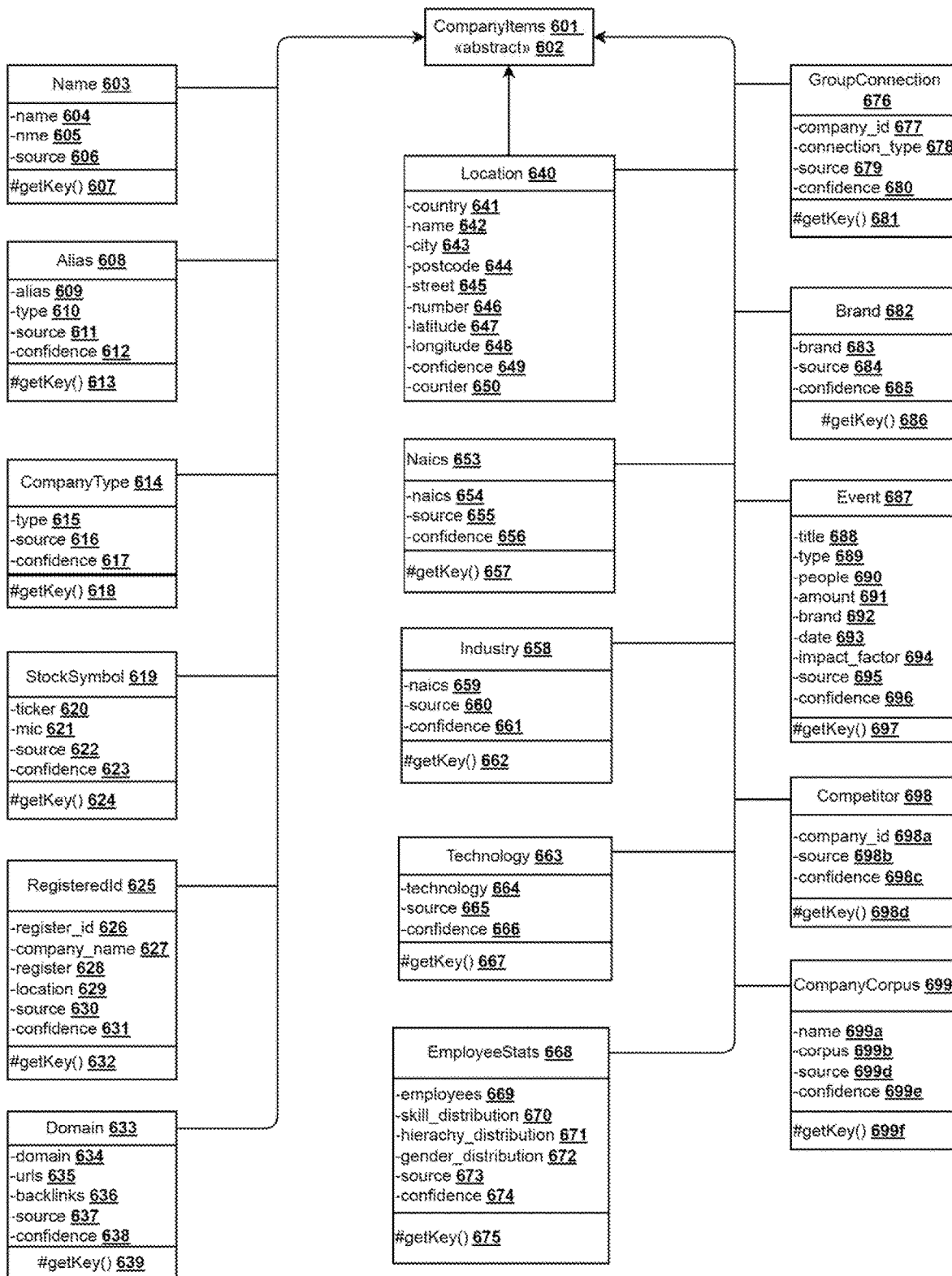
FIG. 6 is a snapshot illustrating a plurality of subclasses used by entity disambiguation computer for representing data attributes, in accordance with a preferred embodiment of the invention.

FIG. 6 is a snapshot illustrating a plurality of subclasses used by entity disambiguation computer 420 for representing data attributes. CompanyItems 601 is an abstract class to bundle all the subclasses that represent company attributes, such as Location, StockSymbol, etc. In the embodiment, the data attributes may be associated with subclasses and each subclass comprises a corresponding getKey ( ) function, such that each getkey ( ) may return a key as a single string that represents data stored in a respective object. For instance, in an embodiment, when companyitems 601 is stored in the slice 548, companyitems 601 may be keyed by project controller 442 using the string returned by a corresponding get_key ( ). That is, for each companyitems 601 sub-class, the string returned by its corresponding get_key ( ) may correspond to concatenated attribute values of that class, except for confidence 649.

In an embodiment, each subclass of the plurality of subclasses may be bundled in an abstract class, labeled as companyItems 601. The plurality of subclasses may be associated with different data attributes. For example, subclass name 603 may include name-related objects including name 604, nme 605, and source 606. Subclass name 603 may further comprise a getKey( ) function 607 linked with the object such that data extractor 422 may extract a key associated with the object from a key value class. In an embodiment, name 603 may be used by data extractor 422 to extract names of companies and/or organizations for further classification. For example, a registered name of a given company may be extracted by data extractor 422 using stored data in names 604 of the company. Further, object nme 605 may be used by data extractor 422 to extract information regarding the normalized name of the company. Furthermore, data extractor 422 may extract data source information from source 606. In some embodiments, the data source 606 may be external data sources such as resume data, company websites, government filings, social media, etc., or internal data sources such as company records, internal reports, annual reports, and the like. Source 606 may be similar to external data source 440 described in FIG. 4B.

In an embodiment, the plurality of subclasses may further comprise alias 608. In the embodiment, alias 608 may be used by data extractor 422 to extract information about various name variations for a given company or organization at different periods in time. Further, alias 608 may comprise information including objects alias 609, type 610, source 611, and confidence 612. In an example, data extractor 422 may extract different name variations for the given company, including but not limited to abbreviations, past names, short-form names, and the like, using alias 609. Further, data extractor 422 may obtain the type 610 of the alias, for example, if the given alias is an abbreviation. Furthermore, data extractor 422 may identify a source of the extracted information stored within alias 609 and type 610, using data available in source 611. The source of extracted information may be an external source or an internal source. Further, a string returned by getkey( ) 613 may correspond to concatenated attribute values that may be used by project controller 442 to key data stored within alias 608.

In an embodiment, a confidence score may be generated by project controller 442 using data stored in confidence 612, to authenticate data extracted from various data sources 440 under subclass name 603. The confidence score may then be used by classifier 426 to determine datasets to be filtered during further classification processes.

The plurality of subclasses may further comprise companytype 614. In an embodiment, project controller 442 may use information from companytype 614 to determine what category a particular company or organization falls into. The categories may include, but are not limited to, sole proprietorship, partnership, corporation, and Limited Liability Company (LLC). In the embodiment, data extractor 422 may determine the category of the given company using data extracted from company type 615. Further, entity disambiguation computer 420 may also identify a source of information about the category from data stored within source 616. As described in the foregoing, project controller 442 may again generate a confidence score 617 for the extracted data based on values retrieved from confidence 617. Further, a string returned by getkey( ) 618 may correspond to concatenated attribute values that may be used by project controller 442 to key data stored within companytype 614.

In an embodiment, the plurality of subclasses may further comprise stocksymbol 619. In the embodiment, project controller 442 may identify stock market information associated with a given company or organization based on data associated with stocksymbol 619 including objects ticker 620, mic 621, source 622, and confidence 623. In an example, stock market information may include ticker symbol information and other IPO based information, as retrieved by project controller 442 from ticker 620. Further, data extractor 422 may extract information about the stock exchange on which the ticker symbol is listed from mic 621. Furthermore, details about a source from which stock information is retrieved may be determined by data extractor 422 using source 622. Finally, project controller 442 may also generate a confidence score for the extracted data for subclass stock symbol 619 based on values retrieved from confidence 623. Further, a string returned by getkey( ) 624 may correspond to concatenated attribute values that may be used by project controller 442 to key data stored within stocksymbol 619.

In another embodiment, the plurality of subclasses further comprises registeredId 625. In the embodiment, data extractor 422 may obtain registered identification for a given company or organization using objects including register_id 626, company_name 627, register 628, location 629, source 630, and confidence 631. For example, data extractor 422 may extract data about registered IDs for the company or organization using data stored in register_id. In an embodiment, the registered ID is the identity of the company and may be referred to as an identity record. Further, entity disambiguation computer 420 may determine, for each registered ID, the name of the company using company_name 627 and the register where the company ID is recorded using register 628. Furthermore, for each registered ID for the company, data extractor 422 may also identify an associated location value from location 629. The source from which the above data is accumulated may be identified by data extractor 422 using information stored in source 630. Finally, project controller 442 may generate a confidence score for the data extracted related to information 626-630, based on information stored within confidence 631. Further, a string returned by getkey( ) 632 may correspond to concatenated attribute values that may be used by project controller 442 to key data stored within registerID 625.

In another preferred embodiment, the plurality of subclasses further comprises domain 633. In the embodiment, data extractor 422 may use the subclass domain 633 to identify and retrieve relevant information associated with domain names for a given company or organization. For example, the information may comprise active domain names, dormant domain names, alternative domain names, and the like for the given company. Further, data extractor 422 may identify domain name information based on data associated with domain that are stored in objects including domain 634, URLs 635, backlinks 636, source 637, and confidence 638. For example, entity disambiguation computer 420 may identify the registered domain names using data stored within domain 634. Further, entity disambiguation computer 420 may extract information about the Uniform Resource Links (URLs) for each of the registered domain names using data from URL 635. Furthermore, data extractor 422 may extract information regarding data stored within backlinks 636. The backlinks may include website URLs. As described in the foregoing, project controller 442 may again determine one or more sources of the relevant information, from data stored within source 637. Further, for each source identified, project controller 442 may calculate a confidence score, indicative of the authenticity of the source, using data extracted from confidence 638. Further, a string returned by getkey( ) 639 may correspond to concatenated attribute values that may be used by project controller 442 to key data stored within domain 633.

In one embodiment, the plurality of subclasses further comprises location 640. In the embodiment, data extractor 422 may extract data relevant to different locations associated with a given company or organization including, but not limited to, headquarter location, location of incorporation, warehouse locations, countries, cities, postcodes, and the like, using location 640. As depicted, location data may be extracted from objects including country 641, name 642, city 643, postcode 644, street 645, number 646, latitude 647, longitude 648, and confidence 649. In an example, entity disambiguation computer 420 may identify the name of location, country, city, postcode, and street number using data from country 641, name 642, city 643, postcode 644, street 645, and number 646, respectively. Further geocode information having values for latitude and longitude may be identified by data extractor 422 using data stored within latitude 647 and longitude 648, respectively. Further, counter 650 may store a count of how often the given location has been used in the data corresponding to the given company, for example in employment records. This may help to distinguish small office locations with only a few employees from the main locations where the majority of employees may be located. In an embodiment, geocoder( ) 651 may call the geolocator ( ) 512 to retrieve the latitude 647 and longitude 648 of the given location. Further, a string returned by getkey( ) 652 may correspond to concatenated attribute values that may be used by project controller 442 to key data stored within location 640.

In one embodiment, the plurality of subclasses further comprises naics 653. In the embodiment, data extractor 422 may extract data relevant to NAICS codes associated with a given company or organization using objects naics 654, source 655, and confidence 656. In an example, data extractor 422 may extract information about different NAICS codes based on data stored within naics 654. Further, project controller 442 may identify one or more sources from which said information is sourced, based on data extracted from source 655. For each such identified source, project controller 442 may calculate a confidence score based on relevant data stored within confidence 656. Further, a string returned by getkey( ) 657 may correspond to concatenated attribute values that may be used by project controller 442 to key data stored within naics 653.

In another embodiment, the plurality of subclasses further comprises industry 658. In the embodiment, entity disambiguation computer 420 may use industry 658 to determine relevant industry sectors a given company operates in, such as but not limited to, legal, manufacturing, logistics, e-commerce, software, and the like. In an example, entity disambiguation computer 420 may identify said industry sectors based on information stored in objects naics 659, source 660, and confidence 661. For instance, entity disambiguation computer 420 may identify the type of industry based on NAICS codes as retrieved from naics 659. Further, entity disambiguation computer 420 may determine one or more sources from which said NAICS codes are obtained, using information stored in source 660. Furthermore, entity disambiguation computer 420 may link a confidence score for each source, based on data extracted from confidence 661. Further, a string returned by getkey( ) 662 may correspond to concatenated attribute values that may be used by entity disambiguation computer 420 to key data stored within industry 658.

In a preferred embodiment, the plurality of subclasses may further comprise technology 663. In the embodiment, entity disambiguation computer 420 may use data from technology 663 to determine one or more technology domains a company operates in. For example, the technology domains may include the Internet of Things (IoT), medical devices, wearables, intelligent transportation systems, robotics, IT, and the like. The technology domains may be identified by entity disambiguation computer 420 based on information stored in objects technology 664, source 665, and confidence 666. For instance, entity disambiguation computer 420 may identify the type of technology domain based on data retrieved from technology 664. Further, entity disambiguation computer 420 may determine one or more sources from which said data is obtained, using information stored in source 660. Furthermore, entity disambiguation computer 420 may link a confidence score to each source, based on data extracted from confidence 666. Further, a string returned by getkey( ) 667 may correspond to concatenated attribute values that may be used by entity disambiguation computer 420 to key data stored within technology 663.

In an embodiment, the plurality of subclasses may further comprise employeestats 668. In the embodiment, entity disambiguation computer 420 may identify employee statistics for one or more employees of a given company or organization, using employeestats 668. For instance, employee statistics may include information regarding the number of employees, names of employees, skill sets, organizational structure and hierarchy, gender distribution, and the like. In the embodiment, entity disambiguation computer 420 may retrieve the above data from objects including employees 669, skill_distribution 670, hierarchy_distribution 671, gender_distribution 672, source 673, and confidence 674. For example, entity disambiguation computer 420 may determine employee skill sets using data from skill_distribution 670. Further, entity disambiguation computer 420 may identify gender ratios within employees based on data stored within gender_distribution 672. Furthermore, entity disambiguation computer 420 may rate one or more sources of information, as identified using data from source 673, based on the authenticity of a source. The authenticity of the source may be determined by entity disambiguation computer 420 based on respective confidence scores, as determined using data from confidence 674. Further, a string returned by getkey( ) 675 may correspond to concatenated attribute values that may be used by entity disambiguation computer 420 to key data stored within employeestats 668.

In an embodiment, the plurality of subclasses may further comprise groupconnection 676. In the embodiment, entity disambiguation computer 420 may identify related companies based on data associated with group stored in objects including company_id 677, connection_type 678, source 679, and confidence 680. Connection_type 678 may be used to identify information about the type of the given company group connection, for example, if the given company is a parent company or subsidiary of the connected company. Furthermore, entity disambiguation computer 420 may rate one or more sources of information, as identified using data from source 679, based on the authenticity of a source The authenticity of the source may be determined by entity disambiguation computer 420 based on respective confidence scores, as determined using data from confidence 680. Further, a string returned by getkey( ) 681 may correspond to concatenated attribute values that may be used by entity disambiguation computer 420 to key data stored within groupconnection 676.

In yet another embodiment, the plurality of subclasses may further comprise brand 682. In the embodiment, entity disambiguation computer 420 may identify one or more brands associated with a given company or organization. For instance, entity disambiguation computer 420 may determine one or more brand names, brand history, marketing statistics, and the like for one or more brands, using information stored in objects brand 683, source 684, and confidence 685. In an example, entity disambiguation computer 420 may extract relevant information about said one or more brands based on information stored within brand 683. Further, one or more sources for such information may be identified by entity disambiguation computer 420, based on data stored within source 684. For each such identified source, entity disambiguation computer 420 may also determine a confidence score, indicative of the authenticity of each source, using information extracted from confidence 685. Further, a string returned by getkey( ) 686 may correspond to concatenated attribute values that may be used by entity disambiguation computer 420 to key data stored within brand 682.

In another embodiment, the plurality of subclasses may further comprise event 687. In the embodiment, entity disambiguation computer 420 may identify one or more events a given company or organization may have participated in or organized in a given period. For instance, entity disambiguation computer 420 may determine event related information using information stored in objects title 688, type 689, people 690, amount 691, brand 692, date 693, impact_factor 694, source 695, and confidence 696. In an example, entity disambiguation computer 420 may extract relevant information about titles of events and types of events based on information stored within title 688 and type 689, respectively. Further, entity disambiguation computer 420 may identify details about attendees using data from people 690; targeted brand information using data from brand 692; and dates for each event, based on data stored within date 693. entity disambiguation computer 420 may further determine the impact of said events on a given company's business based on data stored within impact_factor 694. Further, one or more sources for such information may be identified by entity disambiguation computer 420, based on data stored within source 695. For each such identified source, entity disambiguation computer 420 may also determine a confidence score, indicative of the authenticity of each source, using information extracted from confidence 696. Further, a string returned by getkey( ) 697 may correspond to concatenated attribute values that may be used by entity disambiguation computer 420 to key data stored within event 687.

In another embodiment, the plurality of subclasses may further comprise competitor 698. In the embodiment, entity disambiguation computer 420 may identify one or more competitors of a given company or organization using objects company_id 698a, source 698b, and confidence 698c. For instance, entity disambiguation computer 420 may determine competitor company IDs based on data stored within company_id 698a. Further, one or more sources for such information may be identified by entity disambiguation computer 420, based on data stored within source 698b. For each such identified source, entity disambiguation computer 420 may also determine a confidence score, indicative of the authenticity of each source, using information extracted from confidence 698c. Further, a string returned by getkey( ) 698d may correspond to concatenated attribute values that may be used by entity disambiguation computer 420 to key data stored within competitor 698.

In another embodiment, the plurality of subclasses may further include companycorpus 699. A corpus, in one embodiment, may refer to a collection of unstructured text associated with a given company. This text may originate from the company website, news articles, and/or other sources of information associated with the given company. In the embodiment, entity disambiguation computer 420 may use data associated with companycorpus 699 to compare a semantic embedding of the text corpus of a company profile with the embedding of the text corpus of other company profiles. In a preferred embodiment, such semantic embeddings may be computed by entity disambiguation computer 420 using a pre-trained language model, e.g., DistilBERT. The use of a language model that is pre-trained on large text-corpora is a common approach in art. However, a person skilled in art would appreciate that other forms of semantic representations may also be used instead or in addition. For the comparison of the corpora, the resulting embedding vector of each corpus is compared by entity disambiguation computer 420 to other corpus vectors with a common vector similarity metric, such as cosine similarity.

In one embodiment, companycorpus 699 may include information stored in objects name 699a, corpus 699b, source 699d, and confidence 699e. In the embodiment, name 699a may refer to a name given to distinguish the given corpus from other possible corpora. For example, a website corpus of "someCompany" may be named "websiteCorpus-CompanyA". Corpus 699b may contain the actual text of the given corpus. Further, one or more sources for such information may be identified by entity disambiguation computer 420, based on data stored within source 699d. For each such identified source, entity disambiguation computer 420 may also determine a confidence score, indicative of the authenticity of each source, using information extracted from confidence 699e. Further, a string returned by getkey( ) 699f may correspond to concatenated attribute values that may be used by entity disambiguation computer 420 to key data stored within companycorpus 699.

Figure 7:
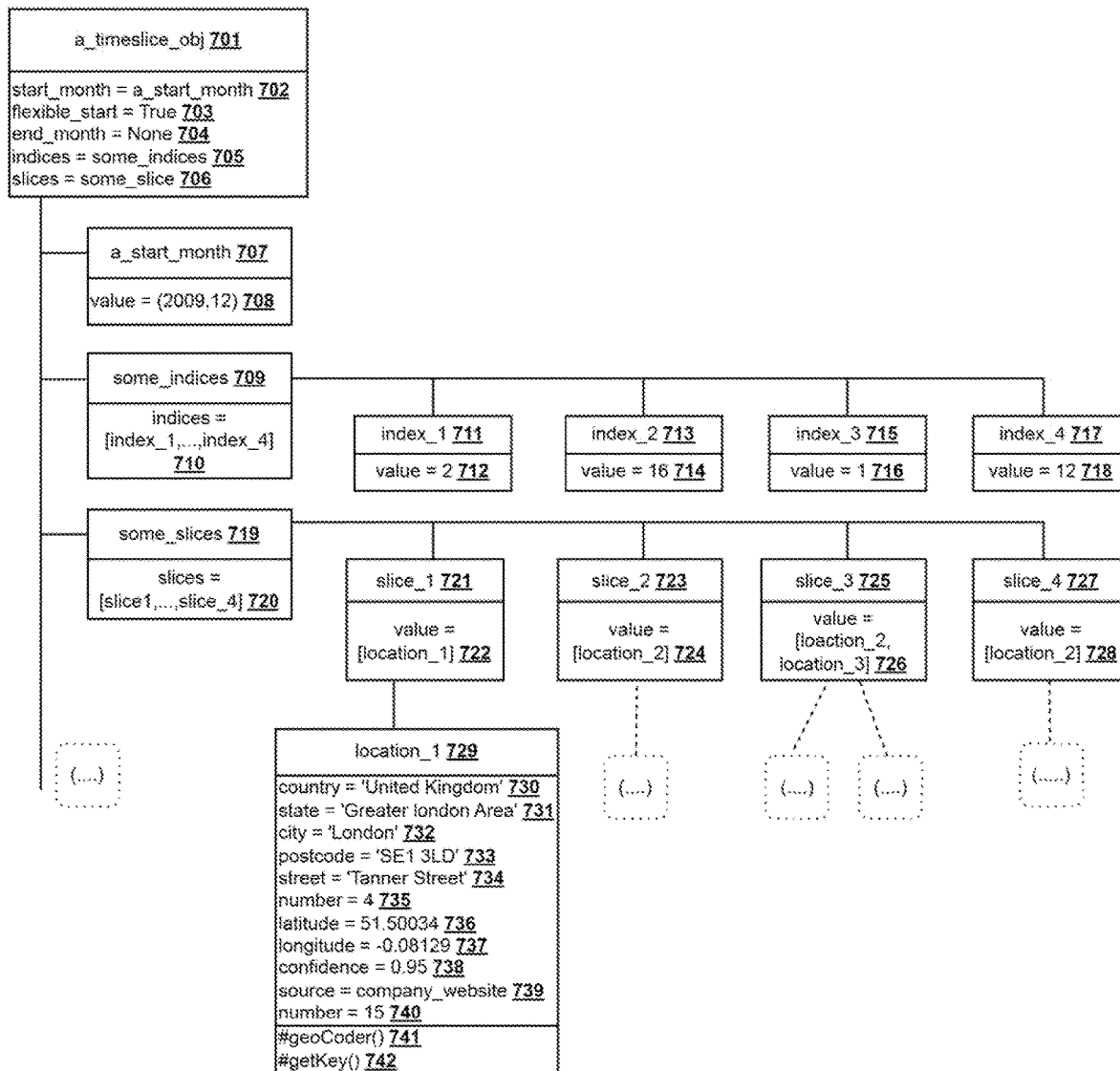
FIG. 7 illustrates a structure of a timeslice object, in accordance with a preferred embodiment of the invention.

FIG. 7 illustrates a structure of a timeslice object, in accordance with a preferred embodiment of the invention. Timeslice objects are used by entity disambiguation computer 420 to manage changes in attribute values over time. Each attribute may be associated with a timeslice and multiple versions of the same attribute may be stored in different timeslice objects. Instead of storing values with a start and optional end date, the whole timeslices object has a start date, and each unchanged set of values is stored within a "Slice" with a given number of months of validity. This translates the time variable into a simple chain of integers, which makes the data retrieval computationally very efficient. In one embodiment, the time variable may be "months", but in other embodiments smaller or larger time variables may be used. FIG. 7 depicts a snapshot of timeslice object a_timeslice_obj 701 representing, in an embodiment, an exemplary instance of the class Time Slices 543; a_start_month 702 referring to a given year and month in a given period in the past, e.g., as given by value=(2009, 12) 708; and attributes flexible_start 703 may correspond to flexible_start 545, end_month 704 may correspond to end_month 546, indices 705 may correspond to indices 547; and slices 706 may correspond to slices 548, for the explanation of the general use of the class instance attributes. flexible_start=true 703, end_month=none 704, indices=some_indices 705, slices=some_slice 706, a_start_month 707, value=(2009,12) 708

The system and object components may further comprise some_indices 709, indicative of an array of integers representing the number of months that each slice in slice 720 is valid for; indices=[index_1, . . . , index_4] 710, may represent example values of some_indices 709;

index_1 711 and value=2 712, maybe example values of the first item in indices 711. That is, in an embodiment, if the corresponding slice object, namely slice_1 721 is valid for 2 months, starting from (2009, 12) 708 the index items/values 713/714, 715/716, 717/718 may refer to the number of months that their corresponding slice objects 721-719 are valid for.

slices=[slice1, . . . , slice_4] 720, slice_1 721, value= [location_1] 722, slice_2 723, value=[location_2] 724, slice_3 725, value=[location_2, location_3] 726, slice_4 727, value=[location_2] 728, location_1 729, an example for a possible location object in the embodiment. country='united kingdom' 730, state='greater London area' 731, city='London' 732, postcode='se1 3ld' 733, street='tanner street' 734, number=4 735, latitude=51.50034 736, longitude=−0.08129 737, confidence=0.95 738, source=company_website 739, number=15 740, geocoder( ) 741, getkey( ) 742

DETAILED DESCRIPTION OF EXEMPLARY EMBODIMENTS

In an embodiment, entity disambiguation computer 420 may build entity database 432 as an object and associate the object with data attributes as described in FIG. 5. Further, time-sensitive attributes may be stored within timeslice objects, as described in detail in FIGS. 6 and 7. Entity disambiguation computer 420 builds entity database 432 of candidate companies using information from external data sources 440 received over the network 310.

In an embodiment, entity disambiguation computer 420 may ingest timed company metadata, for example, from a PostgreSQL database version 13.1. In an embodiment, timed metadata may comprise one or more stock symbols, each linked to a specific company within a given time frame. The timed company metadata may further comprise official company headcount reporting, each reporting linked to a given company at a given point in time, or an average over a given time frame. Entity disambiguation computer 420 may ingest general company metadata comprising company website and URL information, and registered IDs. Furthermore, entity disambiguation computer 420 may extract and ingest company data from employment records comprising company data as gleaned from company records and including job titles, skill sets, location of employment, educational degrees of employees, and the like. Based on the type of information entity disambiguation computer may 420 may use different techniques to extract and disambiguate the received information before extracting the data attributes.

Figure 8:
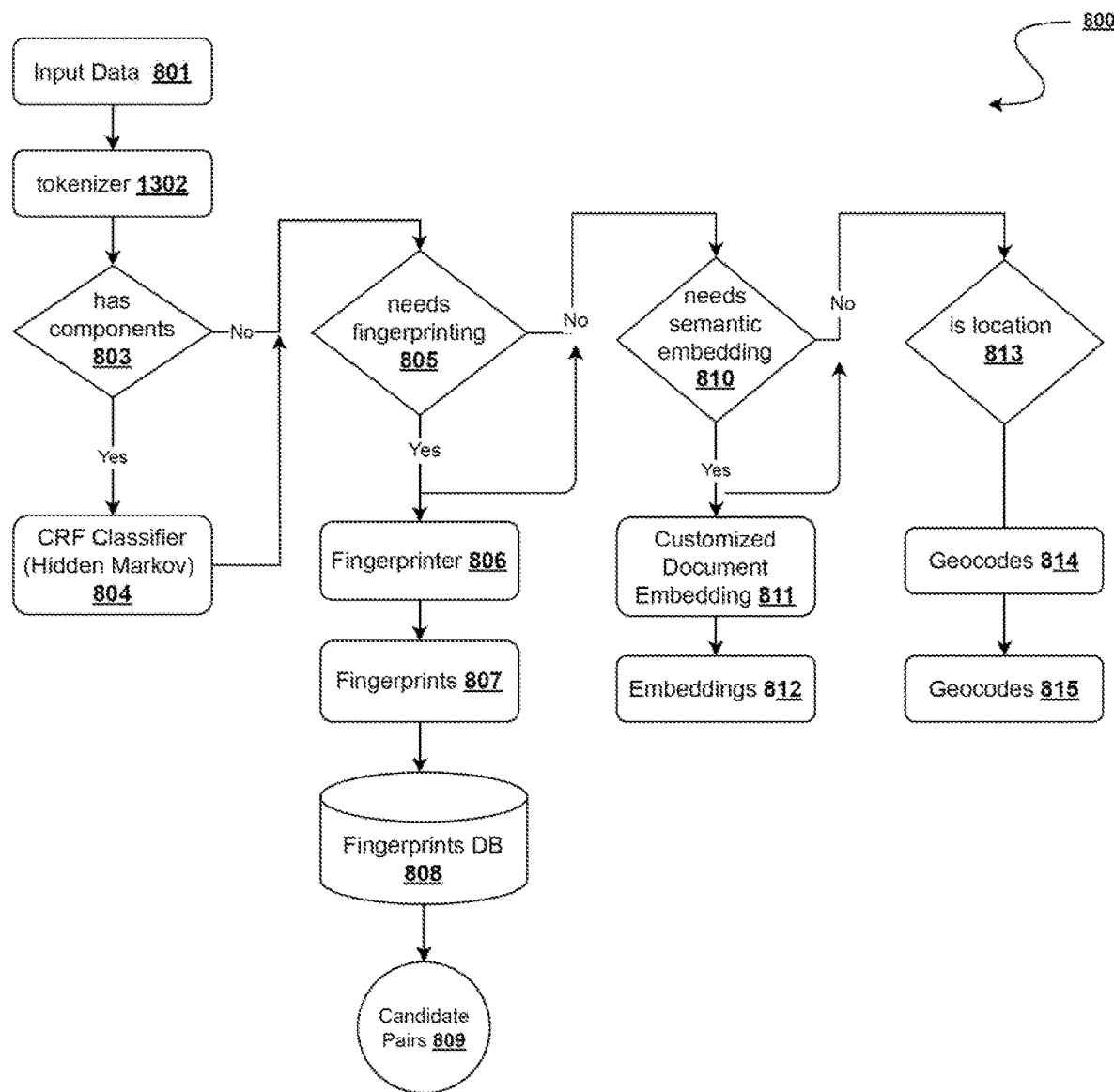
FIG. 8 illustrates a flow diagram for extracting and disambiguating attributes, in accordance with a preferred embodiment of the invention.

Referring now to FIG. 8, there is shown method 800 for extracting and disambiguating attributes present in information from external data sources 440, in accordance with a preferred embodiment of the invention. In an embodiment, entity disambiguation computer 420 may build entity database 432 of candidate companies based on timed attributes such as names, aliases, locations, competitor information, industry sectors, technology domains, and the like. Based on the attributes present in the information, different disambiguating techniques may be used.

In the first step 801, entity disambiguation computer 420 may receive input data from external data sources 440. In step 802, tokenizer 424 may tokenize the input data. Tokenization is a process common in natural language processing in which the input string is broken down into sub-components called tokens. Tokens may be words, characters or n-grams. In the embodiment, the tokenizer returns a collection of distinct word tokens. In an embodiment, tokenized data may include attributes such as company names and industries. In an embodiment, the text is split when any of the following characters: "/", ",", ";", "-", "—", "_", ":" are present in the input data.

In step 803, entity disambiguation computer 420 may determine based on the attribute type whether the returned tokens can be categorized into components. In the embodiment, only company names are broken down into components. For example, a company name may be comprised of components, such as a base name, and a legal identifier, such as "limited". If it is determined by entity disambiguation computer 420 that the attribute tokens may form distinct components, in the next step 804, entity disambiguation computer 420 may initiate a conditional random fields (CRF) classifier (i.e., hidden Markov) to identify and classify distinct components. A CRF classifier is a machine-learning model that has to be trained before doing predictions. To train a CRF classifier for company names, training data has to be collected. Training data is a sample of company names, where individual and combined name tokens have been tagged with one of a distinct set of pre-defined component types. For example 'Cognism Ltd. The United Kingdom may be tagged: {'Cognism': 'base_name', 'ltd.': 'legal_identifier', 'United Kingdom': 'location'}. The CRF model is then trained based on the labeled tokens. After training, the classifier may be used to classify unseen company name tokens that were not part of the training data.

In step 805, CRF classifier 430 may determine if the attribute value or its distinct components, if applicable, need fingerprinting. Fingerprints are either variations of the attribute values individually or in combination with other attribute values. The goal of fingerprints is to find pairs of potentially matching companies in a database (candidates) that should be compared 1:1 in another process. For example, the fingerprints for a company could be:
1. First 5 characters of the lower-cased name+separator (':')+country
2. Company name component 'base name'+separator (':')+country
3. Website domain If fingerprinting is required, in next step 806, the attribute value is fed to a fingerprinter database to generate fingerprints in next step 807. The fingerprints may be saved in a fingerprint database in step 808. To identify suitable fingerprints, a sample of pairs of matching and distinct company records has to be collected. This is usually done by manual review. Or it can be collected by identifying records that have been previously matched by exact identifiers but have slightly different profile attribute values. Then potential fingerprint rules must be defined, such as in the examples above. Then the fingerprints for each of the company profiles in the sample are generated. Next, a set cover algorithm has to be applied to the set of potential fingerprinting rules about the sample. The goal is that the matching records in the sample share at least one fingerprint. Set cover algorithms identify the subsets of a set that cover most of its elements with the least number of subsets.

In the example above, based on fingerprinting rules, the fingerprints for Cognism would be:
1. "cogni:united kingdom"
2. "cognism: united kingdom"
3. "cognism.com"

Those fingerprints 807 are then queried in the fingerprints database to find potential match candidates. Further, in step 1309, candidate pairs are yielded based on the results of the query. The candidate pairs refer to attribute pairs that share one or more fingerprints.

Otherwise, in step 810, entity disambiguation computer 420 may determine whether the token needs semantic embedding. A semantic embedding is a vectorized representation of the semantic meaning of the attribute value. Semantically similar values are placed in closer proximity to each other in the vector space. An attribute is generally suited and required for semantic embedding if the similarity of values cannot be measured from the value pairs themselves. For example, the company industry attribute values should be embedded, because the similarity of terms like 'advertising' and 'marketing' cannot be determined directly by direct means like string similarity. If it is determined by entity disambiguation computer 420 that the token needs semantic embedding, in step 811, entity disambiguation computer 420 may initiate a customized semantic embedding. Such an embedding can be achieved in many ways. The embodiment learns an embedding classifier by training a multilayer perceptron neural network with one hidden layer. For the example of industries, the training objective is to predict the canonical industry of a given company profile based on tokens and token sequences that appear in the textual component of the profile. After the multilayer perceptron has been trained on this task, the vector generated in the hidden layer of the neural network is the semantic embedding of the input sequence. Further, in step 812, embeddings may be generated.

Otherwise, in the next step 813, entity disambiguation computer 420 may determine whether the attribute is a location. If it is determined that the attribute is a location, in step 814, entity disambiguation computer 420 may determine associated geocodes and store the geocodes in step 815. In an embodiment, entity disambiguation computer 420 may initiate location disambiguation and geocoding using regular expressions to match text patterns and cross-reference identified location components against one or more geocodes databases. The tokens and token sequences of location attribute values are compared against a ground-truth database of known locations. If the location can be matched with a ground-truth location, the geo-coordinates obtained from the database are assigned to the location attribute value.

FIG. 9A is a flow diagram illustrating a method 900A for ingesting and storing entity-related data in entity database 432, in accordance with a preferred embodiment of the invention.

In step 901, entity disambiguation computer 420 may receive information from external data sources 440. In an embodiment, the external data sources may include resume data, company employee database, social media database, government database, and the like.

In step 903, entity disambiguation computer 420 may check for an existing entity using a key identifier. If an existing entity is found, in step 904, entity disambiguation computer 420 may add the existing entity to an existing entity list. Otherwise, in step 905, entity disambiguation computer 420 may add the information to a new entity. In an embodiment, entity disambiguation computer 420 may include a set of timeslice objects for each attribute extracted from the information.

In step 906, entity disambiguation computer 420 may query an attribute configuration database 906 for one or more attributes to determine if the attribute is organized as a timeslice object or not. In step 907, entity disambiguation computer 420 may retrieve one or more relevant attributes from the attribute configuration database 906. In an embodiment, entity disambiguation computer 420 may add new timeslice objects for each relevant attribute, as described in step 905. In step 908, entity disambiguation computer 420 may determine whether date-related information for each attribute exists. If it is determined by entity disambiguation computer 420 that date-related information for each attribute does not exist, in the next step 909, for the observed time information, entity disambiguation computer 420 may perform steps 910-912.

In step 910, entity disambiguation computer 420 may ingest data at pre-configured (or dynamic) intervals in entity database 432. An example of a possible pre-configured interval can be to collect a current version of the company website corpus monthly. An example of a dynamic ingestion interval could be to ingest a name update for a given entity when such a name change is detected by an external data provider. In step 911, entity disambiguation computer 420 may identify changes based on interval ingestion. Further, in step 912, entity disambiguation computer 420 may create or update one or more timeslice objects for each relevant attribute. Referring back to step 908, if it is determined by entity disambiguation computer 420 that date-related information is available for each relevant attribute, entity disambiguation computer 420 may create or update one or more timeslice objects for each relevant attribute, as described in step 912. In step 913, the company may be added by entity disambiguation computer 420 to a database, such as entity database 432. In step 914, entity disambiguation computer 420 may receive the next information from the data source and method 900 may continue to step 903.

FIG. 9B is a flow diagram illustrating method 900B for managing timeslice objects, in accordance with a preferred embodiment of the invention. Entity disambiguation computer 420 manages the attributes associated with the entities using timeslice objects. In an embodiment, method 900B may be performed by entity disambiguation computer 420 periodically based on a preferred interval.

In step 916, entity disambiguation computer 420 receives information from external data sources 440. In an embodiment, entity disambiguation computer 420 may be configured to connect to external data sources 440 and receive information periodically over network 310.

In step 918, entity disambiguation computer 420 extracts one or more attributes from the information. Data extractor 422 and other NLP tools may be used by entity disambiguation computer 420 to normalize, tokenize and disambiguate data before extracting attributes. In some embodiments, data ingestion at step 916 and attribute extraction at step 918 may be performed simultaneously.

In step 920, entity disambiguation computer 420 creates a set of timeslice objects and indices. For each attribute, different timeslice objects are created and maintained in the entity database 432. Each attribute stored may be associated with a timeslice and different values of the same attribute may be associated with different timeslice objects. The multiple versions of the attributes received from different external data sources 440 are stored as different timeslice objects Further, the period or duration for which an attribute is valid is added as an index. In some cases, the same attribute may have different periods in which they are valid. For such timeslice objects, multiple indices may be present. The different timeslice objects may be multiple versions of the attribute. The use of timeslice objects for representing attributes enables entity disambiguation computer 420 to identify attribute pairs (i.e., a subset of timeslice objects) that may be similar and can be combined. Further, entity disambiguation computer 420 arranges the timeslice objects and indices based on timelines associated with the timeslice objects. The arrangement of timeslice objects is based on the timeline associated with the timeslice objects.

In step 922, entity disambiguation computer 420 performs a check to determine whether a new timeslice object has been created. When a new timeslice object is created, entity disambiguation computer 420, at step 924, determines the position of the new timeslice objects with respect to the positions of other timeslice objects for the attribute. The position of the new timeslice object is determined based on the period for which the new timeslice object is valid.

In step 926, entity disambiguation computer 420 updates the arrangement of timeslice objects associated with the attribute based on the position of the new timeslice object. The updates in the arrangement of timeslice objects may include but is not limited to, the generation of new timeslice object, the generation of new timeslice index, the merging of timeslice objects, and the splitting of timeslice objects. FIGS. 10-12 describe updates performed in the arrangement of timeslice objects based on different positions of the new timeslice object with respect to the existing timeslice objects and indices. The continuous update in the timeslice objects allows entity disambiguation computer 420 to compare attribute pairs (i.e. timeslice objects) and to determine if the attributes are similar and can be merged into one.

FIG. 10-12 illustrate flow diagrams depicting different methods for updating a plurality of timeslice objects, in accordance with a preferred embodiment of the invention. FIG. 10 illustrates a flow diagram for method 1000 for creating timeslice objects and managing updating a plurality of timeslice objects when a new timeslice object starts before other timeslice objects on the timeline.

In step 1001, entity disambiguation computer 420 may determine if a timeslice object is available for the received attribute. If it is determined by entity disambiguation computer 420 that no timeslice object is unavailable, in step 1002, entity disambiguation computer 420 may add the timeslice object as the value of a given company attribute. Further, for a given timeslice object 543, in step 1003, entity disambiguation computer 420 may add a start date to the timeslice object 543. In step 1004, entity disambiguation computer 420 may add the duration of a given first slice as the first index.

However, if it is determined by entity disambiguation computer 420 that the timeslice object is available, in step 1001, entity disambiguation computer 420 at step 1005 may calculate the duration from the timeslice start date to the start date of the new timeslice object. If a negative duration is calculated by entity disambiguation computer 420, in step 1006, entity disambiguation computer 420 may update a timeslice start date. A negative duration is computed when a first date (e.g., start date) associated with the new timeslice object is ahead of a second date (e.g., start date) associated with the previous timeslice object. Further, in step 1007, entity disambiguation computer 420 may add a new timeslice object. Otherwise, if entity disambiguation computer 420 calculates a positive duration, the method may continue to FIG. 11, wherein the new timeslice object may begin after the start date of a previous timeslice object.

In step 1009, entity disambiguation computer 420 may determine whether the duration of the new timeslice object is smaller than the negative duration. If it is determined by entity disambiguation computer 420 that the duration of the new timeslice object is smaller than the negative duration, in step 1010, entity disambiguation computer 420 may insert a new index in the first position with a duration from the new start date to duration of the new timeslice object. In an example, entity disambiguation computer 420 may determine if a duration associated with the new timeslice object is less than the duration of the previous timeslice object. The previous timeslice object is adjacent to the new timeslice object in the plurality of timeslice objects associated with the attribute. Further, in step 1011, entity disambiguation computer 420 may add the duration of the new timeslice object to the negative duration.

In step 1012, entity disambiguation computer 420 may determine if the duration of the new timeslice object is still negative. If it is determined by entity disambiguation computer 420 that the duration is still negative, in step 1013, entity disambiguation computer 420 may create and insert new empty timeslice with an index of the absolute value of the remaining negative duration. Otherwise, method 1000 may terminate.

Referring back to step 1009, If it is determined by entity disambiguation computer 420 may determine if the duration of the new timeslice object is not smaller than the negative duration, in step 1014, entity disambiguation computer 420 may insert a new index in the first position with an absolute value of the negative duration from the new start date to old start date. Further, in step 1015, entity disambiguation computer 420 may deduct the value of the new index from the duration of the previous timeslice object for generating the first index in the first position for a previous timeslice object. In step 1016, entity disambiguation computer 420 may deduct the duration from the added index from the total duration of the new timeslice object to calculate the remaining duration.

FIG. 11 illustrates a flow diagram depicting method 1100 for updating a plurality of timeslice objects when a new timeslice object starts after the other existing timeslice objects on the timeline. Method 1100 is performed by entity disambiguation computer 420 when the start date of the new timeslice object is ahead of the duration of the previous timeslice object. The previous timeslice object is adjacent to the new timeslice object on a timeline. In an embodiment, the timeline may be days, months, or years. In another embodiment, the timeline may be hours or minutes. In some cases, based on the attribute type different timelines may be used.

In step 1101, the process is continued from FIG. 10 until step 1008. Method 1100 is performed when the duration from a previous timeslice object's start date to the start date of the new timeslice object is positive. In step 1102, entity disambiguation computer 420 may iterate through the old indices (for each old index). In step 1103, entity disambiguation computer 420 may deduct the previous timeslice objects' old index associated with the previous timeslice object from the remaining duration. In step 1104, entity disambiguation computer 420 may determine whether the remaining duration is greater than or equal to zero. If it is determined by entity disambiguation computer 420 that the remaining duration is greater than or equal to zero, in step 1105, entity disambiguation computer 420 may add the new timeslice object to the previous timeslice object that refers to the previous timeslice objects' old index. Further, in step 1106, entity disambiguation computer 420 may determine whether the remaining duration is greater than zero in the new item. If it is determined by entity disambiguation computer 420 that the remaining duration is not greater than zero, in step 1107, method 1100 stops.

Otherwise, in step 1108, entity disambiguation computer 420 may determine whether the current old index is the last old index. If entity disambiguation computer 420 determines that the current old index is the last old index, in step 1109, entity disambiguation computer 420 may further determine whether the start of the new timeslice object has been reached. If it is determined by entity disambiguation computer 420 that the start of the new timeslice object has not been reached, in step 1110, entity disambiguation computer 420 may add an empty slice with an index as the difference between the end date of the previous timeslice object and the new timeslice object start date. Otherwise, in step 1111, entity disambiguation computer 420 may add a timeslice object with the new timeslice object data and the remaining duration of the new item.

Referring back to step 1104, if it is determined by entity disambiguation computer 420 that the remaining duration is not greater than or equal to zero, in step 1112, entity disambiguation computer 420 may reduce the previous timeslice objects index to its old value minus the remaining new timeslice object item's duration. Further, in step 1113, entity disambiguation computer 420 inserts a copy of the previous timeslice object with the remaining duration of the new timeslice object item before the previous timeslice object. Finally, in step 1114, entity disambiguation computer 420 may add new data to the copied slice.

FIG. 12 illustrates a flow diagram for method 1200 for managing overlapping timeslice objects on the timeline, according to a preferred embodiment of the invention.

In step 1201, entity disambiguation computer 420 may iterate through the old indices for each old index. In step 1202, entity disambiguation computer 420 may deduct the current old index from the difference between the start date of the current slice to the start date of the new item start date. Further, in step 1203, entity disambiguation computer 420 may determine whether the difference after deducting the current old index is greater than or equal to zero. If it is determined by entity disambiguation computer 420 that the difference is greater than or equal to zero, in step 1204, entity disambiguation computer 420 may keep the current old slice index unchanged.

In step 1205, entity disambiguation computer 420 may determine whether the current old index is the last old index. If the current old index is not the last old index, method 1200 continues to step 1201. Otherwise, in step 1206, entity disambiguation computer 420 may determine whether the start of the new item has been reached. If it is determined by entity disambiguation computer 420 that the start of the new item has not been reached, in step 1207, entity disambiguation computer 420 may add an empty timeslice object with an index as a difference between the previous timeslice objects end date and the new timeslice objects start date. Otherwise, in step 1208, entity disambiguation computer 420 may add a new timeslice object with the new timeslice objects data and the remaining duration of the new item.

Referring back to step 1203, if it is determined by entity disambiguation computer 420 that the difference is not greater than or equal to zero, in step 1209, entity disambiguation computer 420 may reduce the previous timeslice index to its old value minus the difference after deducting previous timeslice index. Further, in step 1210, entity disambiguation computer 420 may insert a copy of the previous timeslice object with the difference computed in step 1202. In step 1211, entity disambiguation computer 420 may add new data to the copied slice. In step 1212, entity disambiguation computer 420 may deduct the difference from the additional timeslice object duration. In an embodiment, in step 1213, entity disambiguation computer 420 may determine whether the remaining duration is greater than zero in the new item. If it is determined that the remaining duration is not greater than zero, in step 1214, method 1200 stops. Otherwise, method 1200 continues to step 1215.

FIG. 13A-B illustrates different scenarios in which the position of a new timeslice object affects the arrangement of existing timeslice objects on a timeline, in accordance with a preferred embodiment of the invention. Each time new information is received, after extraction and disambiguation of the attribute, entity disambiguation computer 420 may determine the position of the new timeslice object on the timeline among the existing timeslice objects. Based on the position of the new timeslice object, entity disambiguation computer 420 may update the arrangement of the existing timeslice objects. The update may include, but is not limited to, the generation of additional timeslice objects, addition to indices, a split of indices, a split of timeslice objects, deletion of timeslice objects, and deletion of indices.

1304 shows a scenario when a start and end date of the new attribute starts and ends before a previous timeslice object in the multiple timeslice objects associated with an attribute. Referring to FIG. 10, entity disambiguation computer 420, at step 1005 determines a negative duration between the start date of the new attribute compared to the start date of the previous timeslice object and generates the new timeslice object 1301. 1302 is the previous timeslice object that is adjacent to the new timeslice object 1301 on the timeline. The previous timeslice objects' 1302 start time is ahead of the start date of the new timeslice objects' 1301 start date. However, there is an information gap in the timeline between the new timeslice object 1301 and the previous timeslice object 1302. Referring to FIG. 10, entity disambiguation computer 420, at step 1009 determines a negative duration between the end date of new timeslice object 1301 and the start date of the previous timeslice object 1302 in method 1000. To fill the information gap 1321 in the timeline, entity ambiguation computer 420 may generate an additional timeslice object with the duration of the information gap 1321. This additional timeslice object fills the information gap between the end date of the new timeslice object 1301 and the start date of the previous timeslice object 1302.

1308 shows a scenario when a new timeslice object 1305 is created by entity disambiguation computer 420 when a start date and end date of the new attribute starts and ends before a previous timeslice object in the multiple timeslice objects associated with the attribute. 1306 is the previous timeslice object that is adjacent to the new timeslice object 1305 on the timeline. The new timeslice object 1305 starts before the start date of the previous timeslice object 1306 and ends exactly at the start date of the previous timeslice object 1306 start. Referring to FIG. 10, entity disambiguation computer 420, at step 1009 determines a zero duration between the end date of new timeslice object 1305 and the start date of the previous timeslice object 1306, and no further steps are performed in method 1000.

1312 shows a scenario when the start date and end date of the new attribute is before the end date of the previous timeslice object in the multiple timeslice objects (1310, 1311) associated with the attribute. Referring to FIG. 10 and method 1000, entity disambiguation computer 420, at step 1005 determines a negative duration between the start date of the new attribute compared to the start date of the previous timeslice object and generates the new timeslice object 1309. After the generation of new timeslice object 1309, the method 1000 at step 1009 determines a positive duration between the start date of the new timeslice objects 1309 and the previous timeslice object 1310. The steps 1014 and 1015 are computed. The index associated with timeslice object 1310 is split into a first index and a second index. The duration of the first index is a time period for which the new timeslice object 1309 overlaps the previous timeslice object 1310, and the duration of the second index is a remaining duration when the previous timeslice object 1309 is non-overlapping with the new timeslice object 1310.

1316 shows a scenario when the start date of the new attribute is before the start date of the previous timeslice object in the multiple timeslice objects (1314, 1315) associated with the attribute. Referring to FIG. 10 and method 1000, entity disambiguation computer 420, at step 1005 determines a negative duration between the start date of the new attribute compared to the start date of the previous timeslice object and generates the new timeslice object 1313. 1314 is the previous timeslice object that is adjacent to the new timeslice object 1313 on the timeline. Referring to FIG. 10 and method 1000, entity disambiguation computer 420, at step 1009, determines a positive duration between the start date of the previous timeslice object 1314 and the end date of the new timeslice object 1313. Steps 1014-1016 are computed. A first index is generated for new timeslice object 1313. The duration of the first index is the time-period between the start date of the new timeslice object 1313 and the start date of the previous timeslice object 1314. This duration is deducted from the duration of previous timeslice object 1314 to determine the overlap duration between new timeslice object 1313 and previous timeslice object 1314. However, after deducting the remaining duration of the previous timeslice object 1314 is zero. As the remaining duration is zero, there are no changes to the previous timeslice object 1314.

1320 shows a scenario when the start date of the new attribute is before the start date of the previous timeslice object in the multiple timeslice objects (1318, 1319) associated with the attribute. Referring to FIG. 10 and method 1000, entity disambiguation computer 420, at step 1005 determines a negative duration between the start date of the new attribute compared to the start date of the previous timeslice object and generates the new timeslice object 1317. 1318 and 1319 are the previous timeslice objects that overlap with the new timeslice object 1317 on the timeline. Referring to FIG. 12 and method 1200, entity disambiguation computer 420, at step 1201, iterates through the previous indices for each previous timeslice object. Steps 1201-1214 are performed. The previous timeslice objects 1318, 1319 are combined with the new timeslice object 1317. The new timeslice object 1317 has two indices. The first index covers the duration between the start date of timeslice object 1317 and the start date of timeslice object 1318, and the second index combines the durations of both timeslice object 1318 and timeslice object 1319 minus the duration of the first index.

1330 shows a scenario when the start date of the new attribute is before the start date of the previous timeslice object in the multiple timeslice objects (1332, 1333) associated with the attribute. Referring to FIG. 10 and method 1000, entity disambiguation computer 420, at step 1005 determines a negative duration between the start date of the new attribute compared to the start date of the previous timeslice object and generates the new timeslice object 1131. 1332 and 1333 are the previous timeslice objects that overlap with the new timeslice object 1331 on the timeline. Referring to FIG. 12 and method 1200, entity disambiguation computer 420, at step 1201, iterates through the previous indices for each previous timeslice object. Steps 1201-1208 are performed. The new timeslice object 1331 is updated to have three indices. A first index covers the duration between the start of timeslice object 1331 and the start of timeslice object 1332. A second index that combines the durations of both timeslice object 1332 and timeslice object 1333. A third index captures the duration between the end date of timeslice object 1333 and the end date of timeslice object 1331.

1334 shows a scenario when the start date of the new attribute is after the start date of the previous timeslice object in the multiple timeslice objects (1337, 1338) associated with the attribute. Referring to FIG. 10 and method 1000, entity disambiguation computer 420, at step 1005 determines a positive duration between the start date of the new attribute compared to the start date of the previous timeslice object start date and generates new timeslice object 1339. 1338 and 1337 are the previous timeslice objects that are adjacent to the new timeslice object 1339 on the timeline. Referring to FIG. 11 and method 1100, entity disambiguation computer 420, at step 1009, iterates through the previous indices for each previous timeslice object. Steps 1102-1111 are performed through the previous indices for each previous timeslice object. A difference between the duration of the new timeslice object 1339 and the previous timeslice object 1138 is computed. An additional timeslice object is added in the previous timeslice object 1138 with a duration equal to the computed difference. For the remaining duration of the new timeslice object 1138, entity disambiguation computer 420 determines whether the last index in the previous timeslice object has reached and the new timeslice object has started. The duration remaining in the new timeslice object after reaching the start date of the new timeslice object 1339 is used for creating an additional index in the new timeslice object.

1340 shows a scenario when the start date of the new attribute is after the start date of the previous timeslice object in the multiple timeslice objects (1341, 1342) associated with the attribute. Referring to FIG. 10 and method 1000, entity disambiguation computer 420, at step 1005 determines a positive duration between the start date of the new attribute compared to the start previous timeslice object start date and generates new timeslice object 1346. 1341 and 1342 are the previous timeslice objects that are adjacent to the new timeslice object 1346 on the timeline. Referring to FIG. 11 and method 1100, entity disambiguation computer 420, at step 1102, iterates through the previous indices for each timeslice object. Steps 1102-1107 are performed. A difference between the duration of the new timeslice object 1346 and the previous timeslice object 1342 is computed. As there is no overlap between the previous timeslice object 1342 and the new timeslice object 1346, the full duration of the new timeslice object is added to the new timeslice object 1346. In 1340, the position of the new timeslice object 1346 does not affect the arrangement of the existing timeslice objects 1341 and 1342.

1347 shows a scenario when the start date of the new attribute is after the start date of the previous timeslice object in the multiple timeslice objects (1348, 1349) associated with the attribute. Referring to FIG. 10 and method 1000, entity disambiguation computer 420, at step 1005 determines a positive duration between the start date of the new attribute compared to the start date of the previous timeslice objects and generates new timeslice object 1350. 1348 and 1349 are the previous timeslice objects that are adjacent to the new timeslice object 1346 on the timeline. Referring to FIG. 11 and method 1100, entity disambiguation computer 420, at step 1102, iterates through the previous indices for each timeslice object. Steps 1102-1111 are performed. A difference between the duration of the new timeslice object 1350 and the previous timeslice object 1349 is computed. The new timeslice object's 1350 start date is ahead of the end date of the previous timeslice object 1349 start date and there is a gap between the new timeslice object 1350 and the previous timeslice object 1349 on the timeline. Referring to FIG. 11 entity disambiguation computer 420 determines (at step 1109) that the start date of new timeslice object 1350 is not reached. To fill the gap 1351 in the timeline, entity ambiguation computer 420 may generate an additional timeslice object with the duration of gap 1321. The duration of this additional timeslice is the difference between the end date of the previous timeslice object 1349 and the start date of the new timeslice object 1350.

FIG. 14A is a flow diagram illustrating a method 1400A for disambiguating attributes associated with a candidate entity, in accordance with a preferred embodiment of the invention.

In step 1401, entity disambiguation computer 420 may receive information from external data sources 440. In an embodiment, entity disambiguation computer 420 may be configured to connect to external data sources 440 and receive information periodically over network 310.

In step 1404, entity disambiguation computer 420 extracts one or more attributes from the information. Data extractor 422 and other NLP tools may be used by entity disambiguation computer 420 to normalize, tokenize and disambiguate data before extracting attributes. In some embodiments, data ingestion at step 1401 and attribute extraction at step 1404 may be performed simultaneously in a single step.

In step 1406, entity disambiguation computer 420 creates a set of timeslice objects. For each attribute, a set of different timeslice objects may be created and maintained in the entity database 432. Each attribute is stored and associated with a timeslice object and different values of the same attribute may be associated with different timeslice objects. The multiple versions of the attributes received from different external data sources 440 are stored as different timeslice objects. The use of timeslice objects for representing attributes enables entity disambiguation computer 420 to identify attribute pairs (i.e., timeslice object subset) of the same entity that may be similar and can be combined. Further, entity disambiguation computer 420 arranges the set of timeslice objects and indices for each attribute based on timelines associated with the timeslice objects.

In step 1408, entity disambiguation computer 420 selects a subset of timeslice objects from the set of timeslice objects for candidate comparison based on an overlap between durations in the respective subset of timeslice objects. In an embodiment, entity disambiguation computer 420 may train a tree model for the pre-selection of the timeslice objects. In an embodiment, entity disambiguation computer 420 may use manually annotated ("supervised") training examples to train the tree model, to facilitate the identification of a pre-selection of candidate timeslice objects (i.e., attribute pairs) for each company. For example, the pre-selection of candidate timeslice objects may contain a single company. Further, one or more algorithms used to train the tree model may include, but are not limited to, Random Forrest algorithm, Gradient Boosting algorithm, and Decision Tree algorithm.

In step 1410, entity disambiguation computer 420 predicts if the subset of timeslice objects corresponds to the same entity by comparing the overlapping durations in the timeslice objects using a similarity model. Entity disambiguation computer 420 may train a similarity model for candidate comparison. In an embodiment, entity disambiguation computer 420 may train a model to predict, if two or more given candidate entities (i.e., timeslice objects) are the same and hence should be merged. In the embodiment, entity disambiguation computer 420 may train the model based on the pre-selection of candidate timeslice objects as well as one or more training algorithms. One or more training algorithms may include different Tree Algorithms such as Random Forrest, Regression Algorithms, Neural Networks, or Vector Similarity Algorithms like Euclidean Distance model paired with a learned threshold. In step 1414, entity disambiguation computer merges the subset of timeslice objects into a single entity identity record as they belong to the same entity. The details related to the selection of the subset of timeslice objects and the process of prediction using the overlapping durations are described in detail in FIG. 14B. In some embodiments, the steps 1408 and 1410 may be combined and performed as a single step.

FIG. 14B is a flow diagram illustrating a method 1400B for predicting if timeslice objects belong to the same candidate entity, in accordance with a preferred embodiment of the invention.

In step 1420 for each candidate company, overlapping durations may be identified. This is achieved by comparing the timeslice objects' start dates and end dates. This is performed by comparing the attribute values of the given set of attributes pair. The overlapping time units may be called o=0, . . . t. The overlapping duration may be months, weeks, days, or even hours.

In step 1421, a pair of corresponding timeslice objects may be prepared. For each attribute, the overlapping parts of the timeslice objects form such an attribute value pair. In step 1422, the timeslice objects may be fed to a comparator. For each time overlap of distinct attribute values, the comparator determines a distance value of the values between profile 1 and profile 2 of the pair. The distance may be determined by mean, minimum or maximum distance between the distinct value pairs if multiple values are present. Alternatively, multiple values may be semantically embedded jointly in steps 1421 and 1422. For each comparator attribute, in step 1423, the attribute may be inputted into a vectorizer. The vectorizer converts the durations represented by timeslice objects into vector attribute values. In step 1424, distance vectors may be generated. This may be achieved by simply concatenating the distance values into a vector of distances. In the embodiment, an attribute $d \in \{d0, \ldots dn\}$ corresponds to a specified distance and the attribute value is the corresponding distance value. In an optional step, the distance vector may be embedded by a trained neural network.

In step 1425, an N×T matrix is generated by joining all distance values over all overlapping time units. This matrix contains distance values (i.e., distance vectors) corresponding to multiple attribute pairs corresponding to the entity. Multiple distance matrices may be generated for multiple attributes. For each input matrix, a comparison is performed using a convolutional neural network (CNN), in step 1426. CNN is a neural network that can be trained based on matrix representations of input elements. In the embodiment, the input matrices are the distance matrices of profile pairs. The CNN is trained by fitting its weights and biases to a training set of attribute pairs that have been previously annotated as matching or distinct entities. After training, the CNN may be used to predict if a given input matrix represents a pair of distinct or matching entities. In step 1427, it is determined whether the attribute pairs should be combined. If yes, in step 1428, the attribute pairs are merged and added to the same entity. If the entities are merged, their attribute timeslice objects and identities are merged into a single identity record. Otherwise, in step 1429, the attribute pairs are not merged and remain unconnected. The merging of the attribute pairs generates an unambiguous entity database 432. In an embodiment, the method 1400A and 1400B may be performed independently for each attribute associated with the entity.

The skilled person will be aware of a range of possible modifications of the various embodiments described above. Accordingly, the present invention is defined by the claims and their equivalents.

What is claimed is:

1. A system for disambiguating attributes associated to one or more entities, the system comprising: an entity database; an entity disambiguation computer comprising a memory, a processor, and a plurality of programming instructions, the plurality of programming instructions when executed by the processor cause the processor to: receive by, and store in, the entity database, information associated with a candidate entity among one or more entities in the entity database at pre-defined intervals; extract and store in an attributes database, one or more attributes associated with the candidate entity;

wherein the one or more attributes comprises a location, a geocode, an entity name, a stock symbol, a registered entity identity, an entity classification code, an entity uniform resource links (URLs), an employee data, an entity event, a technology domain, an entity group connection, an entity brand, and a competitor;

generate a linkage data instance for each pair of entities, the linkage data instance comprising a set of attribute value pairs, each attribute value pair including values for a specific attribute from each entity of the pair;

create and store, in the entity database, for each attribute among the one or more attributes, a plurality of timeslice objects, wherein the plurality of timeslice objects are valid for respective durations, and wherein the entity disambiguation computer generates the plurality of timeslice objects based on the one or more attributes extracted from the one or more entities; associate the plurality of timeslice objects with one or more indices based on the respective durations of the plurality of timeslice objects, wherein the plurality of timeslice objects and the respective one or more indices are arranged based on timelines associated with the plurality of timeslice objects; calculate a similarity metric for each attribute value pair in the linkage data instance by applying a comparison algorithm that determines a similarity score based on a data type of the attribute; determine a position of a new timeslice object of the plurality of timeslice objects with respect to positions of other timeslice objects of the plurality of timeslice objects, wherein the new timeslice object is a latest created timeslice object; update the arrangement of the plurality of timeslice objects based on the position of the new timeslice object; determine if the two entities are associated with a same entity based on the calculated similarity metrics in the linkage data instance exceeding a predetermined threshold; responsive to determining that the two entities are associated with the same entity, merge the timeslice objects for the two entities into a single resolved entity object; and store the resolved entity object in the entity database, wherein the entity database provides a single, unified view of entities without ambiguity.

2. The system of claim 1, wherein to update the plurality of timeslice objects, the plurality of instructions when executed by the processor, further cause the processor to:

responsive to determining that a first date associated with the new timeslice object is ahead of a second date associated with a previous timeslice object among the plurality of timeslice objects, determine if a duration associated with the new timeslice object is less than a duration of the previous timeslice object, wherein the previous timeslice object is adjacent to the new timeslice object in the plurality of timeslice objects;

responsive to determining that the duration associated with the new timeslice object is less than the duration of the previous timeslice object, generate a new index in the new timeslice object.

3. The system of claim 2, wherein to update the plurality of timeslice objects, the plurality of instructions when executed by the processor, further cause the processor to:

responsive to determining that the duration of the new timeslice object is less than the duration of the previous timeslice object, generate an empty timeslice object, wherein the empty timeslice object is indicative of an information gap in the timeline between the new timeslice object and the previous timeslice object.

4. The system of claim 2, wherein to update the plurality of timeslice objects, the plurality of instructions when executed by the processor, further cause the processor to:

responsive to determining that the duration associated with the new timeslice object is greater than the duration of the previous timeslice object, split an index associated with the previous timeslice object into a first index and a second index, wherein duration of the first index is a time period for which the new timeslice object overlaps the previous timeslice object, and wherein the duration of the second index is a remaining duration when the previous timeslice object is non-overlapping with the new timeslice object.

5. The system of claim 1, wherein the plurality of instructions when executed by the processor, further cause the processor to:

compute, for each attribute, distance vectors between selected timeslice objects, wherein a vectorizer uses the timeline associated with selected timeslice objects to compute the distance vectors between the selected timeslice objects, wherein the selected timeslice objects share overlapping durations;

predict if the selected timeslice objects correspond to a same entity based on the distance vectors;

responsive to predicting that the selected timeslice objects correspond to the same entity, merging the selected timeslice objects into a single entity identity record; and generate an unambiguous entity database by merging of the selected timeslice objects.

6. A method for disambiguating attributes associated with one or more entities, the method comprising: receiving at an entity disambiguation computer, and storing in an entity database, information associated with a candidate entity among one or more entities in the entity database at predefined intervals; extracting, and storing in an attributes database, one or more attributes associated with the candidate entity;

wherein the one or more attributes comprises a location, a geocode, an entity name, a stock symbol, a registered entity identity, an entity classification code, an entity uniform resource links (URLs), an employee data, an entity event, a technology domain, an entity group connection, an entity brand, and a competitor;

generating a linkage data instance for each pair of entities, the linkage data instance comprising a set of attribute value pairs, each attribute value pair including values for a specific attribute from each entity of the pair;

creating, and storing, in the entity database, for each attribute among the one or more attributes, a plurality of timeslice objects, wherein the plurality of timeslice objects are valid for respective durations, and wherein the entity disambiguation computer generates the plurality of timeslice objects based on the one or more attributes extracted from the one or more entities;

associating the plurality of timeslice objects with one or more indices based on the respective durations of the plurality of timeslice objects, wherein the plurality of timeslice objects and the respective one or more indices are arranged based on timelines associated with the plurality of timeslice objects; calculating a similarity metric for each attribute value pair in the linkage data instance by applying a comparison algorithm that determines a similarity score based on a data type of the attribute; determining a position of a new timeslice object of the plurality of timeslice objects with respect to positions of other timeslice objects of the plurality of timeslice objects, wherein the new timeslice object is a latest created timeslice object; updating the arrangement of the plurality of timeslice objects based on the position of the new timeslice object; and determining if the two entities are associated with a same entity based on the calculated similarity metrics in the linkage data instance exceeding a predetermined threshold; responsive to determining that the two entities are associated with the same entity, merging the timeslice objects for the two entities into a single resolved entity object; and storing the resolved entity object in the entity database, wherein the entity database provides a single, unified view of entities without ambiguity.

7. The method of claim 6, wherein updating the plurality of timeslice objects further comprises the steps of:

responsive to determining that a first date associated with the new timeslice object is ahead of a second date associated with a previous timeslice object among the plurality of timeslice object, determining if a duration associated with the new timeslice object is less than a duration of the previous timeslice object, wherein the previous timeslice object is adjacent to the new timeslice object in the plurality of timeslice objects;

responsive to determining that the duration associated with the new timeslice object is less than the duration of the previous timeslice object, generating a new index in the new timeslice object.

8. The method of claim 6, wherein updating the plurality of timeslice objects further comprises the steps of:

responsive to determining that the duration of the new timeslice object is less than the duration of a previous timeslice object, generating an empty timeslice object, wherein the empty timeslice object signifies an information gap in the timeline between the new timeslice object and the previous timeslice object.

9. The method of claim 7, wherein updating the plurality of timeslice objects further comprises the steps of:

responsive to determining that the duration associated with the new timeslice object is greater than the duration of the previous timeslice object, splitting an index associated with the previous timeslice object into a first index and a second index, wherein duration of the first index is a duration for which the new timeslice object overlaps the previous timeslice object, and wherein the duration of the second index is a remaining duration when the previous timeslice object is non-overlapping with the new timeslice object.

10. The method of claim 6, the method further comprising:

computing, by the entity disambiguation computer, for each attribute, distance vectors between selected timeslice objects, wherein a vectorizer uses the timeline associated with selected timeslice objects to compute the distance vectors between the selected timeslice objects, wherein the selected timeslice objects share overlapping durations;

predicting if the selected timeslice objects correspond to a same entity based on the distance vectors;

responsive to predicting that the selected timeslice objects correspond to the same entity, merging the selected timeslice objects into a single entity identity record; and generating an unambiguous entity database by merging of the selected timeslice objects.

* * * * *